US012586924B2

(12) United States Patent
Taher et al.

(10) Patent No.: US 12,586,924 B2
(45) Date of Patent: Mar. 24, 2026

(54) ANTENNA SYSTEM ARCHITECTURE WITH CALIBRATION FEEDBACK ROUTING FOR PER ELEMENT CALIBRATION WITH DIGITAL BEAMFORMER

(71) Applicant: CesiumAstro, Inc., Austin, TX (US)

(72) Inventors: Tanim Taher, Round Rock, TX (US); Thomas Magesacher, Austin, TX (US); James Wesley McCoy, Leander, TX (US)

(73) Assignee: Cesium Astro, Inc., Austin, TX (US)

( * ) Notice: Subject to any disclaimer, the term of this patent is extended or adjusted under 35 U.S.C. 154(b) by 0 days.

(21) Appl. No.: 18/236,529

(22) Filed: Aug. 22, 2023

(65) Prior Publication Data

US 2025/0253543 A1 Aug. 7, 2025

Related U.S. Application Data

(60) Provisional application No. 63/399,986, filed on Aug. 22, 2022.

(51) Int. Cl.
*H01Q 21/06* (2006.01)

(52) U.S. Cl.
CPC .................................. *H01Q 21/061* (2013.01)

(58) Field of Classification Search
CPC .......... H01Q 1/246; H01Q 1/44; H01Q 21/28; H01Q 3/46; H01Q 1/04; H01Q 3/20; H01Q 19/09; H01Q 3/44; H01Q 21/26; H01Q 3/267; H01Q 3/40; H01Q 21/205; H01Q 3/01; H01Q 3/2605; H01Q 1/243
USPC .......................................................... 455/103
See application file for complete search history.

(56) References Cited

U.S. PATENT DOCUMENTS 8,957,808 B2 * 2/2015 Ookawa .................... G01S 7/40 342/174
2005/0110699 A1 * 5/2005 Timofeev ............... H01Q 1/245 343/797
2011/0140965 A1 * 6/2011 Manasson ............ H01Q 21/061 342/377
2020/0058996 A1 * 2/2020 Reddy .................. H04B 7/0874

* cited by examiner

*Primary Examiner* — Ajibola A Akinyemi
(74) *Attorney, Agent, or Firm* — Hogan Lovells US LLP

(57) ABSTRACT

A system may include multiple digital beamformer (DBF) circuits coupled to an analog front end that includes an antenna array. Each DBF circuit is coupled to a subset of the antenna elements of the array. Each DBF may be configured to adjust coefficients of complex multipliers to selectively enable and disable beams, antenna elements, transmit paths, receive paths, or any combination thereof to enable per-element calibration of the antenna array.

23 Claims, 15 Drawing Sheets

ANTENNA SYSTEM ARCHITECTURE WITH CALIBRATION FEEDBACK ROUTING FOR PER ELEMENT CALIBRATION WITH DIGITAL BEAMFORMER

CROSS-REFERENCE TO RELATED APPLICATION(S)

The present disclosure is a non-provisional application of and claims priority to U.S. Provisional Patent Application No. 63/399,986 filed on Aug. 22, 2022 and entitled "Antenna System Architecture with Calibration Feedback Routing for Per Element Calibration with Digital Beamformer," which is incorporated herein by reference in its entirety.

FIELD

The present disclosure is generally related to systems and methods of transmitting radio frequency signals using antenna arrays, and more particularly to systems and methods of providing per-element digital calibration in an antenna array system.

BACKGROUND

In general, circuitry may heat up during operation. Communication circuitry that generates signals for wireless transmission can heat up during operation, which may produce signal distortion that can introduce transmission errors.

During operation, temperature drift and other circuit phenomena may cause signal distortion that can degrade the performance of the transmission channels (both in-band and out-of-band). In many instances, the power amplifiers may be one of the primary sources of nonlinear distortion.

SUMMARY

Embodiments of systems, methods, and devices are described below that provide a novel routing of calibration data from each element of an antenna array to a central processor from a single digital beamformer circuit or a daisy-chained digital beamformer circuit or from an architecture where the processor is coupled to single digital beamformer circuit or multiple digital beamformer circuits. Calibration data may be obtained via a transmission path to receive path feedback loop, whether conducted over the air (OTA) or via a conducted path. Each element may be calibrated sequentially by toggling digital gain coefficients on each element (both transmit and receive) in a daisy-chained architecture or within all the antenna elements associated with a single digital beamformer circuit. In some implementations, the calibration operations may be performed on a selected antenna element while the phased array is operational, providing beamforming data on other antenna elements of the antenna array. In some implementations, a calibration table for the antenna elements associated with a digital beamformer circuit may be generated in a central processor or inside each digital beamformer circuit. The calibration data may be communicated to the central processor via existing daisy-chain data paths or direct data paths. By toggling coefficients, the digital beamformer circuits may ensure the relevant element calibration data is obtained and communicated for calibration. The feedback path for calibration and the routing techniques described herein may be applied during manufacturing calibration and optionally during operation as a run-time calibration.

In some implementations, a system may include a plurality of digital beamformer circuits coupled to an antenna array. Each digital beamformer circuit may include one or more serial interfaces to enable communicative coupling to other digital beamformer circuits in a daisy-chain configuration. Each digital beamformer circuit may be configured to send signals to and to receive signals from a plurality of antenna elements of the antenna array and to provide data related to received signals to a processor via a serial interface. Each digital beamformer circuit may be configured to enable per-element calibration of the antenna array based on one or more of a passively received signal, measurement data from one or more sensors, or a feedback signal. The system may selectively deactivate one or more of a beam, an antenna element, a beamformer circuit, or a portion of the antenna array during a calibration operation.

In some implementations, a system may include an analog front end and multiple digital beamformer (DBF) circuit coupled to the analog front end. The analog front end circuit may include an antenna array comprised of a plurality of antenna elements. Each DBF circuit is coupled to a subset of the plurality of antenna elements. Each DBF circuit may include a plurality of multipliers and a controller. Each multiplier may include a first input to receive data, a second input to receive a complex multiplier, and an output to provide a complex product. The controller may be configured to adjust coefficients of each of the complex multipliers independently to selectively enable or disable one or more of a beam, a selected antenna element, a transmit path, or a receive path to enable per-element calibration of the antenna array.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

Figure 1:
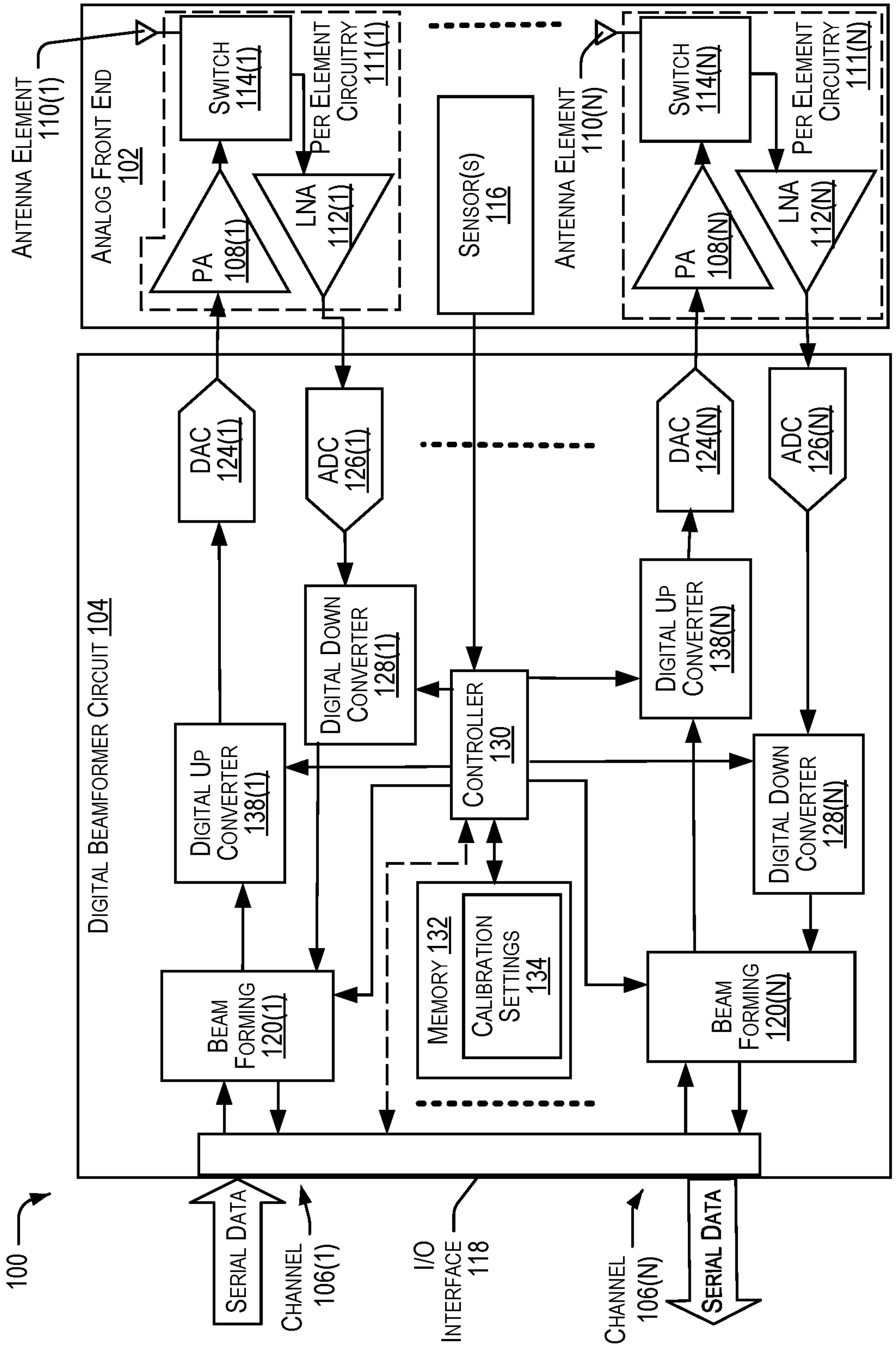
FIG. 1 depicts a block diagram of a system including a digital beamformer circuit configured to provide per-element digital calibration of an antenna array, in accordance with certain embodiments of the present disclosure.

While implementations are described in this disclosure by way of example, those skilled in the art will recognize that the implementations are not limited to the examples or figures described. The figures and detailed description thereto are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include," "including," and "includes" mean "including, but not limited to".

DETAILED DESCRIPTION OF ILLUSTRATIVE EMBODIMENTS

Antenna arrays may send and receive radio frequency signals to other antenna arrays and to devices. The antenna array may include circuitry including power amplifiers (PAs), low-noise amplifiers (LNAs), and other circuitry. Typically, each antenna element is coupled to a PA in the transmission path and an LNA in the receive path. Heating of the circuit due to normal operation can cause temperature drift that may produce non-linearities.

Embodiments of the systems, methods, and devices described below may include an integrated circuit including a plurality of digital beamformer circuits that may be configured to provide per-element digital calibration for an antenna array during manufacturing or during operation (run-time calibration), as well as health check data during operation. The system may be configured to perform passive calibration based on a received signal, based on sensor signals, based on a calibration data sent and received over a feedback path, or any combination thereof. The system may utilize the calibration operations to determine a calibration table on a per-element basis or per region basis for the antenna array. Calibration may include, but is not limited to, phase calibration, power calibration, in-phase and quadrature impairments, time delays, digital pre-distortion, basic health checks, frequency calibration, other calibrations, or any combination thereof.

In some implementations, existing mechanisms in a digital beamformer (DBF) Integrated Circuit (IC) may be exploited to perform per element calibration operation. For some calibration operations, the system may perform a calibration operation for a selected antenna element while the DBF is still able to continue operating at a reduced beam count. The per element complex coefficients for digital multipliers in the DBF may be manipulated to collect calibration data or perform per-element calibration and, by extension, to calibrate the phased array for both transmit and receive transmission paths. The systems and methods described herein may utilize existing circuit components and existing signal paths in a typical DBF chip, or in daisy chained DBF chips to perform efficient calibration of the elements individually.

In some implementations, the system may be configured to toggle digital gain on each element (both transmit and receive) within a single digital beamformer circuit or across multiple digital beamformer circuits in a daisy-chain configuration. Additionally, the system may use existing serial data paths to communicate the calibration data to the central processor. By toggling coefficients, the digital beamformer circuit may be configured to ensure that only the calibration data for the selected antenna element is provided to the processor.

The systems, methods, and architectures described below describe three different calibration modes. In a first mode, the system may perform a passive receive calibration for a selected antenna element by disabling a single beam across the architecture. In a second mode, the system may use a switched feedback path to route data from an output of a transmit path to the receive path of the same antenna element. In this mode, the selected antenna element is removed from all beams, but only one beam is lost to allow the digital beamformer circuit to communicate the calibration data to the processor. In a third mode, the system may take the phased array offline to perform an over the air (OTA) calibration operation.

In some implementations, the system may disable a selected antenna element during a calibration operation. In other implementations, the system may be configured to disable a selected beam from each of the antenna elements to use the selected beam to communicate calibration information. In still other implementations, the system may be configured to cause a first antenna element to transmit and to cause nearby antenna elements to receive and optionally to communicate sensor information to the processor during the calibration operation. Embodiments of the present disclosure enable per-antenna calibration without requiring extra pins. Instead, calibration data may be communicated through existing serial data and control digital channels and via existing receive paths.

FIG. 1 depicts a block diagram of a system 100 including a digital beamformer (DBF) circuit 104 configured to provide per-element digital calibration of an antenna array, in accordance with certain embodiments of the present disclosure. The system 100 may include an analog front end 102, which may include circuitry that may be coupled to antenna elements 110 of an antenna array. The analog front end 102 may be coupled to the DBF circuit 104, which may be coupled to one or more other DBF circuits 104, processing circuits, a computing device, an antenna controller, other devices, or any combination thereof through one or more input/output (I/O) interfaces 118, such as a Serializer/Deserializer (SerDes) interface.

The analog front end 102 may include a power amplifier (PA) 108 including an input coupled to an output of the DBF circuit 104 and including an output coupled to an input of a switch 114. The switch 114 may include an input/output (I/O) interface coupled to an antenna element 110 and an output coupled to an input of a low noise amplifier (LNA) 112. The LNA 112 may include an output coupled to an input of the DBF circuit 104.

In the illustrated example of FIG. 1, only two antenna elements 110(1) and 110(N) are shown. However, the antenna elements 110 may be part of an antenna array comprised of a plurality of antenna elements. The PA 108, the switch 114, and the LNA 112 may be part of circuitry for each element 110 of the array and thus are surrounded by a dashed outline labeled per element circuitry 111. The antenna array may be a phased array that may have K DBF circuits 104 where each DBF circuit 104 supports N antenna elements 110. The total number of antenna array elements 110 is K*N. Each DBF circuit 104 supports N transmit channels plus N receive channels. Each transmit channel provides a transmit signal to one PA 108 that serves one antenna element 110, and each antenna element 110 provides a received signal to one LNA 112 that provides an output to one receive channel. The K DBF circuits 104 may be communicatively coupled (daisy chained) with each other via the I/O interface 118 and associated communications links. The antenna array formed by a plurality of the antenna elements 110 with all the DBF circuits 104 may support B separate beams, and the daisy chained DBF circuits 104 may provide data to and receive data from B modems.

The analog front end 102 may include one or more sensors 116, which may include temperature sensors, power sensors, other sensors, or any combination thereof. The sensors 116 may include one or more outputs coupled to a corresponding one or more inputs of the DBF circuit 104 or may be coupled to the DBF circuit 104 through an alternate communication path. The one or more sensors 116 may generate electrical signals indicative of a parameter of a region of the analog front end 102 corresponding to one or more antenna elements 110 and the associated PAs 108.

The DBF circuit 104 may include a beam forming module 120, a digital up converter, and a digital-to-analog converter (DAC) 124 in a transmission path of a given channel 106. In a receiving path, the DBF circuit 104 may include an analog-to-digital converter (ADC) 126, a digital down converter 128, and the beam forming module 120. The analog front end 102 may include the PA 108, the switch 114, and the antenna 110 in the transmit path, and may include the antenna 110, the switch 114, and the LNA 112 in the receive path.

The DBF circuit 104 may include the one or more I/O interfaces 118, each of which may include a physical connector including a plurality of pins or electrical conductors. In some implementations, the I/O interface 118 may include circuitry configured to facilitate serializing and deserializing of data for sending and receiving data to other circuits and systems via one or more I/O communications links.

The DBF circuit 104 may include a beam forming module 120 that may be configured to apply filter coefficients to received complex beam data to produce channel data for transmission via the antenna elements 110. The beam forming module 120 may be configured to apply filter coefficients to received channel data to produce beam data for communication via the one or more I/O interfaces 118.

The DBF circuit 104 may include a controller 130, which may include one or more I/O interfaces, pins, solder balls, or other contacts configured communicatively couple the controller 130 to other components of the DBF circuit 104. The controller 130 may be coupled to the I/O interface 118 through one or more logical channels or physical channels to receive data and control instructions and to communicate data and optionally control instructions. The controller 130 may be coupled to the one or more sensors 116 associated with the regions of the analog front end 102 (directly via a pin or indirectly via the I/O interface 118) to receive signals indicative of one or more parameters associated with various areas of the analog front end 102. The controller 130 may be coupled to each of the beam forming modules 120.

In some implementations, the one or more sensors 116 may be configured to generate electrical signals indicative of one or more parameters associated with the analog front end. The one or more parameters may include temperature, power level or bias level, other parameters, or any combination thereof.

The controller 130 of the DBF circuit 104 may be coupled to or may include a memory 132, which may include a non-volatile memory device. The memory 132 may be configured to store calibration settings 134, which may include coefficients or settings for selectively disabling some but not all the beams or for selectively controlling one or more components to calibrate one of a receive path or a transmit path of a selected antenna element 110. In some implementations, the memory 132 may also store coefficients for multiplication with the beam data in the transmit path or for multiplication with the channel data in the receive path. In some implementations, the controller 130 may receive a calibration instruction from an external processor via the I/O interface 118, retrieve calibration settings 134 from the memory 132 based on the received calibration instructions, and may control one or more of the beam forming modules 120 based on the retrieved calibration settings 134 to perform a calibration operation.

The system 100 may utilize existing communication paths and control paths of the system architecture to provide per element calibration of the antenna array, in some cases, while the DBF circuits 104 are still able to continue operating at a reduced beam count. The per-element complex coefficients for digital multipliers in the DBF circuits 04 may be manipulated to collect calibration data or perform per-element calibration. Additionally, the per-element complex coefficients may be used to calibrate the phased array for both transmit and receive operations. The system 100 may utilize serial signal paths in a DBF circuit 104 or in daisy chained DBF circuits 104 to perform efficient calibration of the elements, individually, within a region of the array, or across the entire array.

In operation, the transmit operation involves processing beam data for a selected beam across a plurality of complex multiplications on a plurality of DBF circuits 104 to produce channel data for each of a plurality of channels. The DBF circuits 104 may aggregate the channel data for a given channel and provide the aggregated channel data to a selected one of the antenna elements 110. The receive operation may include providing the channel signal from an antenna element 104 to each of a plurality of DBF circuits 104 to perform a plurality of complex multiplications on the channel signal to produce a plurality of beams. The DBF circuits 104 may aggregate the beam data for each given beam and may communicate the aggregated beam data to the I/O interface 118. An example depicting a portion of the complex operation is introduced below with respect to FIG. 2.

Figure 2:
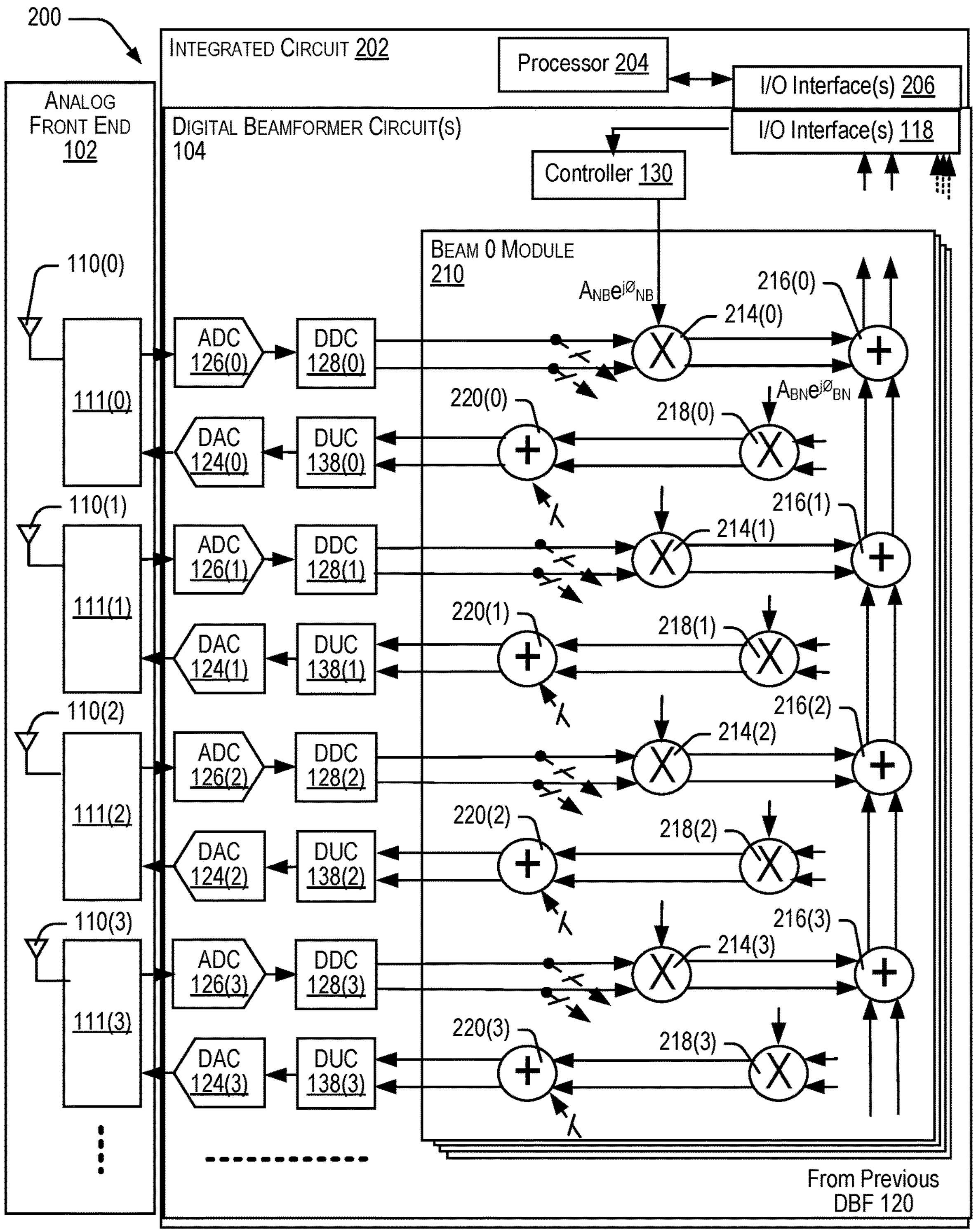
FIG. 2 depicts a block diagram of a portion of a system including a plurality of digital beamformer circuits configured to provide per-element digital calibration of an antenna array, in accordance with certain embodiments of the present disclosure.

FIG. 2 depicts a block diagram of a portion of a system 200 including a plurality of digital beamformer circuits 104 configured to provide per-element digital calibration of an antenna array, in accordance with certain embodiments of the present disclosure. The system 200 may include an analog front end 102 including a plurality of per-element circuits 111, each of which is coupled to one of the antenna elements 110 of the antenna array. The antenna array may be a phased array.

The analog front end 102 may be coupled to an integrated circuit 202. The integrated circuit 202 may include one or more input/output (I/O) interfaces 206, which may couple the integrated circuit 202 to other circuits. The integrated circuit 202 may include a processor 204. In some implementations, the processor 204 may be a baseband processor or may be coupled to a baseband processor via one or more of the I/O interfaces 206. The one or more I/O interfaces 206 may include serial interfaces, parallel interfaces, connection ports, pins, other connectors, or any combination thereof.

The integrated circuit 202 may include multiple DBF circuits 104, at least one of which may be coupled to the I/O interface 206 by its I/O interface 118. The integrated circuit 202 may include K DBF circuits 104 where each DBF circuit 104 supports N antenna elements 110 of the antenna array. The total number of antenna array elements 110 is K*N. Each DBF circuit 104 supports N transmit channels plus N receive channels. Each transmit channel provides a transmit signal to one PA 108 that serves one antenna element 110, and each antenna element 110 provides a received signal to one LNA 112 that provides an output to one receive channel. The K DBF circuits 104 may be communicatively coupled (daisy chained) with each other via the I/O interface 118 and associated communications links. The phased array formed by a plurality of the antenna elements 110 with all the DBF circuits 104 may support B separate beams, and the daisy chained DBF circuits 104 may provide data to and receive data from B modems.

In the illustrated example, each DBF circuit 104 may support four antenna elements 110 of the antenna array. Additionally, in the illustrated example, the integrated circuit 202 may support four DBF circuits 104 such that the integrated circuit may control an array of sixteen antenna elements 110. The integrated circuit 202 and the DBF circuit 104 are illustrative, non-limiting examples. In some implementations, the DBF circuit 104 may support a larger number of antenna elements 110 (such as 8, 16, or another number).

The integrated circuit 202 may include a plurality of DBF circuits 104, which may be communicatively coupled by one or more serial communications links in a daisy-chain configuration via the I/O interfaces 118. One of the DBF circuits 104 may be on the integrated circuit 202 and to DBF circuits 104 of another integrated circuit 202 via one or more other I/O interfaces 206(2). Any number of integrated circuits 202 may be coupled in this matter, and each integrated circuit 202 may include any number of DBF circuits 104. In this example, each DBF circuit 104 is configured to support four antenna elements 110.

The DBF circuit 104 may include the controller 130, which may be coupled to the I/O interface 118(1) and to multipliers 214 and 218 of each of a plurality of beam/channel modules 210. In the receive path, a signal may be received at the antenna element 110(1), processed by the LNA 112 of the per-element circuitry 111(0), and the output signal may be provided to an input of the ADC 126(0). The ADC 126(0) may convert the received analog signal into digital data, which may be provided to a digital downconverter (DDC) 128(0). The DDC 128(0) may convert a digitized, band-limited signal represented by the digital output data of the ADC 126(0) to a lower frequency signal at a lower sampling rate. The in-phase (I) and quadrature (Q) output of the DDC 128(0) may be provided to inputs of the multiplier 214 of each of the beam/channel modules 210. The multiplier 214(0) may multiply the I-Q data by a complex frequency ($A_{N,B}e^{j\emptyset_{N,B}}$) where N is the index number of the antenna element 110 and B is the index for the beam. The complex frequency is thus indexed for each beam and each antenna element 110 to separate the received data into beam data. Each beam/channel module 210 may include adders 216 and 220. The beam data from the multiplier 214(0) may be provided to an adder 216(0), which may accumulate the beam data per beam for each of the B beams and provide the accumulated data to a next DBF circuit 104 or to the baseband processor 204 via the I/O interface 118.

In the transmission path, I and Q data may be received from a modem for a given beam. The I-Q data may be multiplied by a complex frequency ($A_{BC}e^{j\emptyset_{BC}}$) indexed by beam B and channel C via a multiplier 218(0) to produce separated channel data. Each channel corresponds to one of the antenna elements 110. Channel data for each channel is then accumulated on a per channel (per element) basis via the adder 220(0). The adder 220(0) may receive channel data intended for transmission via the antenna element 110(0) from the channel data from multipliers 218 of other beams. The adder 220(0) may combine or accumulate the channel data to produce the output signal for transmission via the antenna element 110(0). In this example, the output of the adder 220(0) is provide to a digital up-converter (DUC) 138(0), which may scale the sample rate of the channel data to a higher frequency for transmission. The DUC 138(0) may provide the up-converted data to a DAC 124(0), which may convert the up-converted data to an analog signal. The output of the DAC 124(0) is coupled to an input of the PA 108 of the per-element circuitry 111(0) for transmission via the antenna element 110(0).

In the illustrated example, for each element, for each of the B beams, the DBF circuit 104 may multiply the I-Q samples of the incoming signal (from the ADC 126) or of the outgoing signal (going to the DAC 124) with a complex exponential that includes an indexed magnitude coefficient $A_{N,B}$ and an indexed phase ØN,B where N denotes the element and B denotes the beam index. There could also be a third index K to denote the DBF circuit 104 within the circuit 202, but that is not shown here for simplicity.

The per-channel configuration shown enables per-element calibration of the antenna array. By adjusting or manipulating the complex frequency multiplier, the controller 130 can use the indexed magnitude coefficient $A_{N,B}$ of the complex frequency multiplier to selectively disable beams ($A_{N,B}=0$) or to pass through the value ($A_{N,B}=1$) from the receive path, depending on the implementation. In an example, to calibrate the antenna element 110(0), the controller 130 may use the complex frequency to enable a selected beam (such as Beam 0) for a selected antenna element N, and to disable the selected beam (such as Beam 0) for each of the other antenna elements 110, while allowing the other antenna elements 110 to continue to receive and to use the other beams ($B\neq 0$). The data received at the selected antenna element 110(0) may be provided to the processor 204 via beam 0 for calibration of the antenna element 110(0).

Each transmit and receive path has a programmable coefficient $A_{N,B}$ for each beam and each antenna element. During a calibration operation, the controller 130 may manipulate the coefficients either to send out a per element calibration signal in the transmit path or to receive a calibration signal per antenna element 110 on the receive path.

The I/O interfaces 118 and 206 may utilize a serial communication protocol (such as a SERDES protocol) to enable communication of baseband signals to a baseband processor 204. In some implementations, multiple DBF circuit 104 may be daisy-chained via the serial I/O interfaces 118 and ultimately connected via the I/O interface 206 to the baseband processor 204. The DBF circuits 104 may utilize these communication paths to provide per-element calibration data for any antenna element 110 of the antenna array to the processor 204.

By manipulating the coefficients, calibration data can be communicated to the baseband processor 204. The calibration data may be used to perform any type of calibration including, but not limited to, power calibration, phase calibration, time-delay calibration, digital pre-distortion calibrations, other calibrations, or any combination thereof.

The calibration operation may be triggered by a control signal received from the processor 204 or may be initiated by the controller 130. In some implementations, the controller 130 or the processor 204 may determine a down period in which signals are not being sent or received and may trigger the calibration operation. In other implementations, the controller 130 or the processor 204 may trigger a calibration operation periodically or in response to one or more signals from the sensors 116. Other triggers are also possible.

Figure 3:
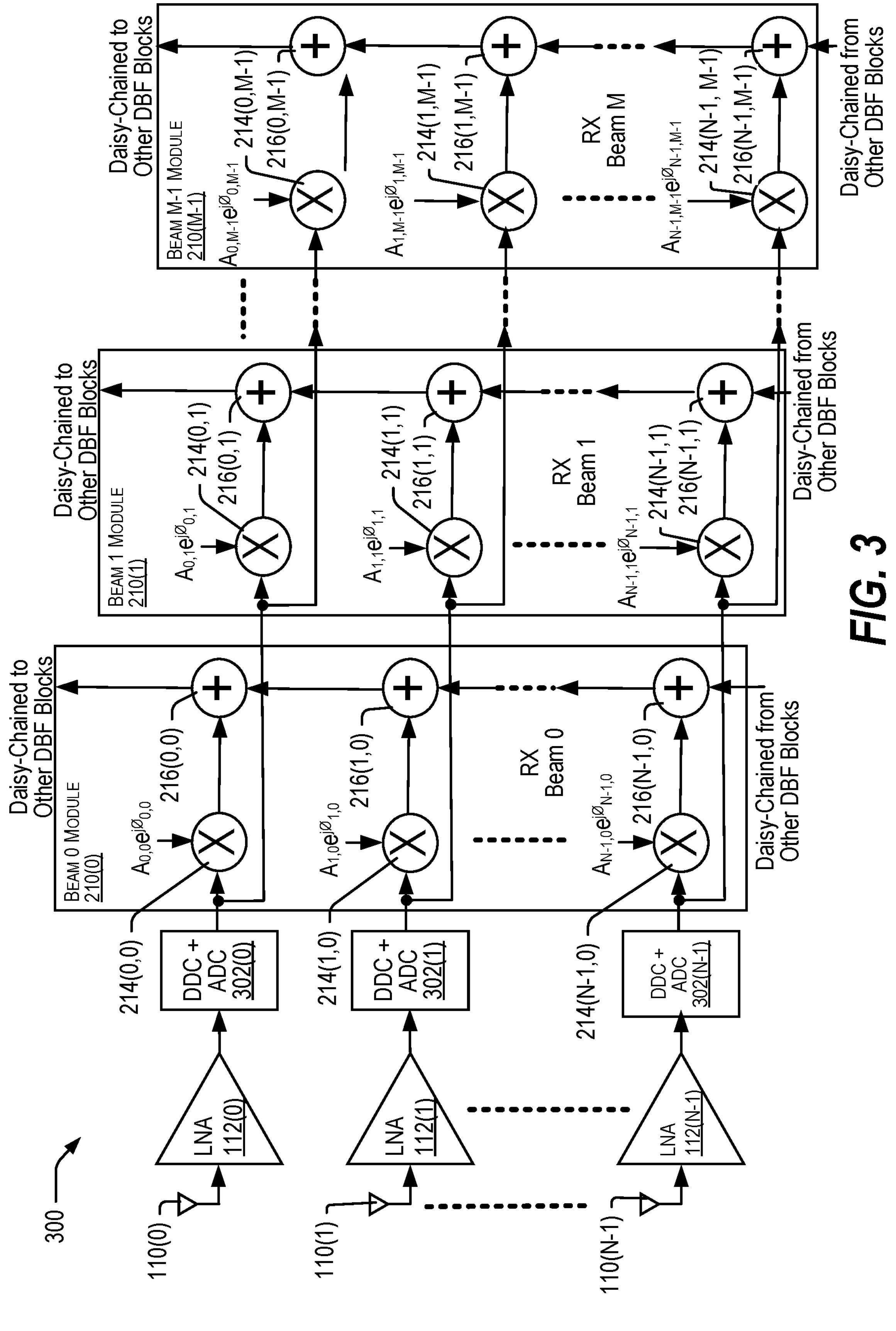
FIG. 3 depicts a block diagram of a portion of the system of FIGS. 1 and 2 depicting receive-side components, in accordance with certain embodiments of the present disclosure.

FIG. 3 depicts a block diagram of a portion 300 of the system 100 or 200 of FIGS. 1 and 2 depicting receive-side components, in accordance with certain embodiments of the present disclosure. In this example, each antenna element 110 is coupled to an input of an LNA 112, which includes an output coupled to an input of a digital downconverter and analog-to-digital converter (DDC+ADC) block 302. The DDC+ADC block 302 includes an output coupled to the input of a multiplier 214. The output of the DDC+ADC block 302 may also be coupled to the input of multiplier blocks 214 of other parallel beam modules 210(1) through 210(M-1).

In the illustrated example, the antenna element 110(0) provides an output signal to the LNA 112(0), which provides an output signal to the input of the DDC+ADC block 302. The output of the DDC+ADC block 302 may be provided to the multiplier 214(0,0), which corresponds to the antenna element 110(0) and beam 0 of B beams. The output of the DDC+ADC block 302 may also be provided to the multipliers 214(0,1), 214(0,2), . . . , 214(0,B-1) of other beam modules 210 in parallel to determine the plurality of beams from the received signal.

Each multiplier includes a second input to receive a complex multiplier $A_{N,B}e^{j\varnothing_{N,B}}$ indexed for the selected beam B and antenna element N. The output of the multiplier 214(0,0) is provided to an input of an adder 216(0,0), which includes a second input to receive data from an adder 216(1,0), 216(2,0), . . . , 216(N-1,0) for each of the antenna elements to aggregate the beam data for a selected beam. In this example, the beam 0 module 210(1) aggregates the beam data for beam 0. The multiplication process and the aggregation process are performed for each beam from the received signals (per beam) across the array of antenna elements 110 using each of the beam modules 210.

The controller 130 can manipulate the beam data by adjusting the coefficient $A_{N,B}$ to allow some beam data to pass and to cancel (or zero out) other beam data. The circuit structure may enable per-element calibration of the antenna array by selectively deactivating a beam from each of the antenna elements and by using the deactivated beam to provide calibration data to a baseband processor 204.

Figure 4:
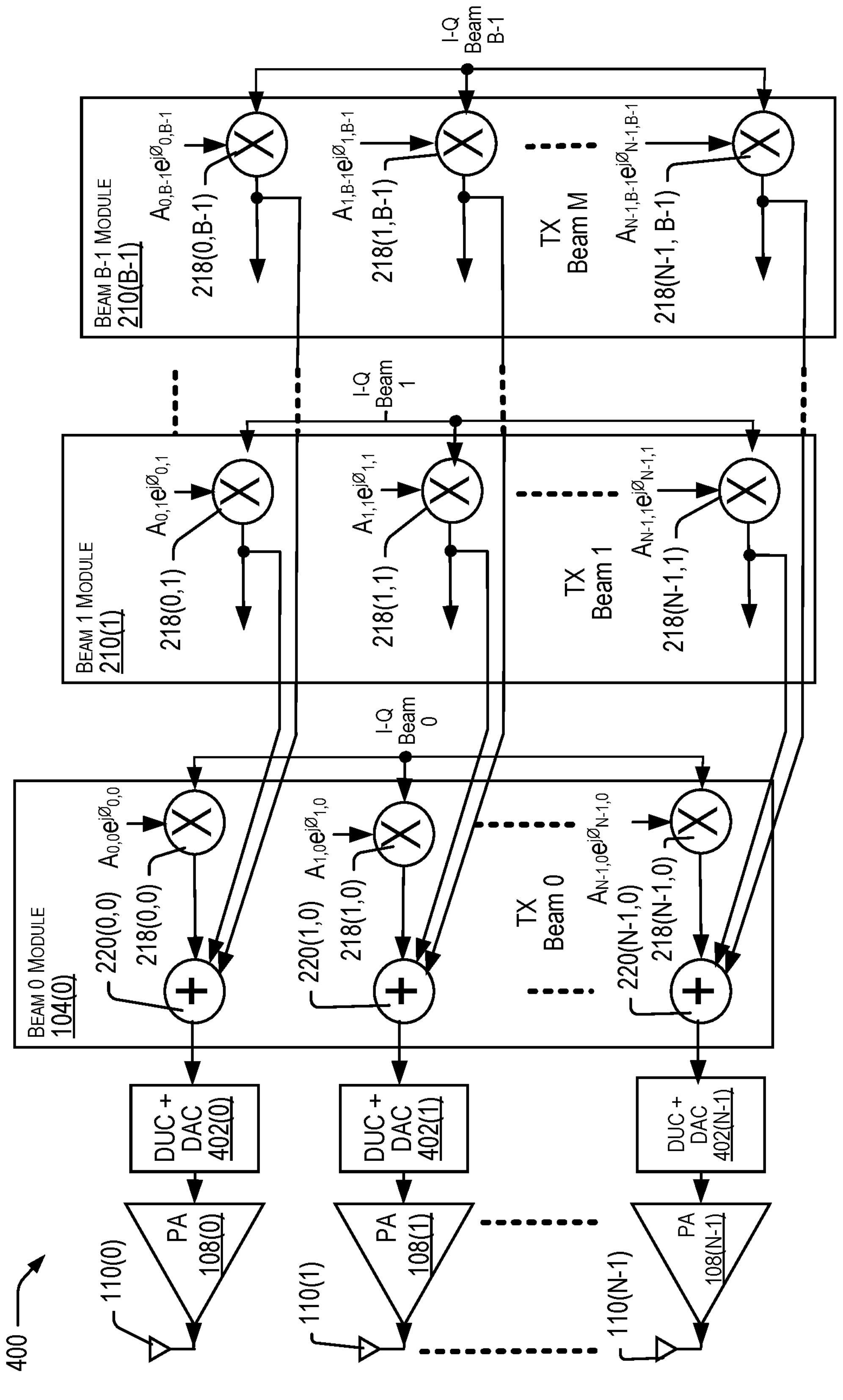
FIG. 4 depicts a block diagram of a portion of the system of FIGS. 1 and 2 depicting transmit-side components, in accordance with certain embodiments of the present disclosure.

FIG. 4 depicts a block diagram of a portion 400 of the system 100 or 200 of FIGS. 1 and 2 depicting transmit-side components, in accordance with certain embodiments of the present disclosure. In this example, a modem may provide complex I-Q beam data for a given beam at an input of each beam module 210 of the DBF 104. The I-Q beam data for the given beam is provided to each of a plurality of multipliers 218 of the beam module 210 for the given beam. In this example, I-Q beam data for the beam 0 is received at an input of each of the multipliers 218(0,0), 218(1,0), through 218(N-1,0) of the beam 0 module 210(0). The multiplier 218(0,0) may multiply the received I-Q beam data for beam 0 with a complex multiplier $A_{0,0}e^{j\varnothing_{0,0}}$ to produce an output including beam 0 data for transmission via the antenna element 110(0). The multiplier 218(0,1) of the beam 1 module 210(1) may multiply the received I-Q beam data for beam 0 with a complex multiplier $A_{0,1}e^{j\varnothing_{0,1}}$ to produce an output including beam 0 data for transmission via the antenna element 110(1). The multiplier 218(0,N-1) of the beam B-1 module 210(B-1) may multiply the received I-Q beam data for beam 0 with a complex multiplier $A_{0,B-1}e^{j\varnothing_{0,N-1}}$ to produce an output including beam 0 data for transmission via the antenna element 110(N-1).

In this example, I-Q beam data for the beam 1 is received at an input of the beam 1 module 210(1) and provided to each of the multipliers 218(0,1), 218(1,1), through 218(N-1,1) of the beam 1 module 210(1). The multiplier 218(0,1) may multiply the received I-Q beam data for beam 1 with a complex multiplier $A_{0,1}e^{j\varnothing_{0,1}}$ to produce an output including beam 1 data that may be provided to the adder 220(0,0) for transmission via the antenna element 110(0). The multiplier 218(1,1) of the beam 1 module 210(1) may multiply the received I-Q beam data for beam 1 with a complex multiplier $A_{1,1}e^{j\varnothing_{1,1}}$ to produce an output including beam 1 data that may be provided to the adder 220(1,0) for transmission via the antenna element 110(1). The multiplier 218(1,N-1) of the beam B-1 module 210(B-1) may multiply the received I-Q beam data for beam B-1 with a complex multiplier $A_{0,N-1}e^{j\varnothing_{0,N-1}}$ to produce an output including beam 1 data that may be provided to the adder 220(N-1,0) for transmission via the antenna element 110(N-1).

In this example, I-Q beam data for the beam B-1 is received at an input of the beam B-1 module 210(B-1) and provided to each of the multipliers 218(0,B-1), 218(1,B-1), through 218(N-1,B-1) of the beam B-1 module 210(B-1).

The multiplier 218(0,B-1) may multiply the received I-Q beam data for beam B-1 with a complex multiplier $A_{0,B\text{-}1}e^{j\varnothing}{}_{B\text{-}1}$ to produce an output including beam B-1 data that may be provided to the adder 220(0,0) for transmission via the antenna element 110(0). The multiplier 218(1,B-1) of the beam B-1 module 210(B-1) may multiply the received I-Q beam data for beam B-1 with a complex multiplier $A_{1,B\text{-}1}e^{j\varnothing}{}_{1,B\text{-}1}$ to produce an output including beam B-1 data that may be provided to the adder 220(1,0) for transmission via the antenna element 110(1). The multiplier 218(N-2,B-1) of the beam B-1 module 210(B-1) may multiply the received I-Q beam data for beam B-1 with a complex multiplier $A_{N\text{-}1,B\text{-}1}e^{j\varnothing}{}_{N\text{-}1,B\text{-}1}$ to produce an output including beam B-1 data that may be provided to the adder 220(N-1,0) for transmission via the antenna element 110(N-1).

The adder 220(0,0) may include inputs to receive the complex outputs of the multipliers 218(0,1) through 218(0, B-1). The adder 220(0,0) may sum the complex outputs to produce an output signal that is provided to an input of the digital up-converter plus digital-to-analog converter (DUC+DAC) 402(0). The DUC+DAC 402 may produce an up-converted analog signal that may be provided to an input of a PA 108(0), which may provide an amplified output to the antenna element 110(0) for transmission. The adders 220(1, 0) through 220(N-1,0) may perform a similar summing operation on the complex outputs from the corresponding multipliers 218.

During a calibration operation, the controller 130 may control the complex multiplier $A_{N,B}$ at each of the multipliers 218 to enable per-element calibration of the antenna array and to communicate the calibration data using the serial I/O interconnections. In this example, transmit paths may be selectively disabled to allow for calibration of a selected antenna element 110.

In some implementations, the DBF circuits 104 may be coupled to one another and to a baseband processing circuit in a daisy-chain configuration. An example of such a configuration is described below with respect to FIG. 5.

Figure 5:
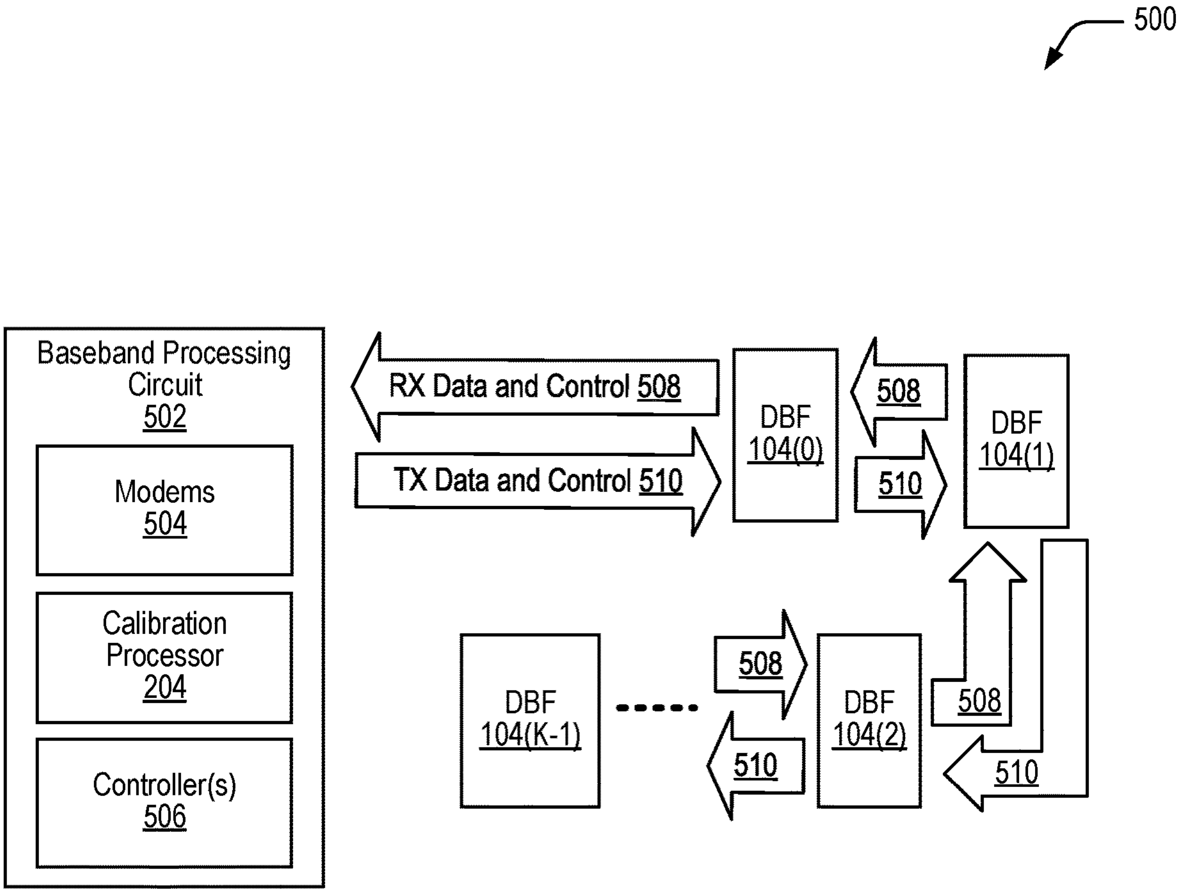
FIG. 5 depicts a block diagram of a system including a plurality of digital beamformer circuits coupled together and to a baseband processing circuit via a daisy-chain configuration, in accordance with certain embodiments of the present disclosure.

FIG. 5 depicts a block diagram of a system 500 including a plurality of DBF circuits 104 coupled together and to a baseband processing circuit 502 via a daisy-chain configuration, in accordance with certain embodiments of the present disclosure. The system 500 may be a representation of any of the systems described above with respect to FIGS. 1-4. The baseband processing circuit 502 may include a plurality of modems 504, such as a modem per beam. The baseband processing circuit 502 may include one or more controllers 506, which may be adapted to control switches or other circuit elements in the analog front end 102 or in other circuits.

The controller 506 may be configured to determine control data and instructions, which may be communicated to the DBF circuits 104 via a serial connection. In some implementation, the controller 506 may be a centralized controller configured to communicate to the plurality of the DBF circuits 104 to individually send configuration data to the controller 130 of each DBF circuit 104 and to receive one or more of calibration data or health check data from one or more of the multiple DBF circuits 104. In an example, the controller 506 may send configuration data to one or more of the DBF circuits 104 to initiate a calibration operation or a health check operation. In response, the one or more DBF circuits 104 may perform the calibration operation or the health check operation and may send calibration data or health check data to the centralized controller 506.

In some implementations, the centralized controller 506 may implement a control channel via input and output (I/O) interfaces 206 to each of the multiple DBF circuits 104 to set the coefficients and orchestrate one of a calibration operation or health check operation. In some implementations, the centralized controller 506 may implement a receive (RX) data and control channel 508 and a transmit (TX) data and control channel 510 to the I/O interface 118 of a first DBF circuit 104(0). The other DBF circuits 104 may daisy chained to provide a serial communication path between the central controller 506 and the DBF circuits 104.

In this example, the system 500 may include a plurality of DBF circuits 104(0 through K-1), and each DBF circuit 104 may include a plurality of beam modules 210(0 through M-1). The baseband processing circuit 502 may be coupled to the DBF 104(0) via receive data and control channels 508 and transmit data and control channels 510. The DBF circuit 104(0) may be coupled directly to the baseband processor 502 via the receive data and control channels 508 and the transmit data and control channels 510. The DBF circuit 104(1) may be coupled to the DBF circuit 104(0) via the receive data and control channels 508 and the transmit data and control channels 510, and so on.

In some implementations, the same serializer/deserializer (SERDES) transport lanes may be used for direct connection between one of the DBF circuits 104 and the baseband processing circuit 502 and for the daisy-chain coupling of the DBF circuits 104 to one another. In other implementations, the DBF circuits 104 may be coupled to the baseband processing circuit 502 in parallel, as shown in FIG. 6.

Figure 6:
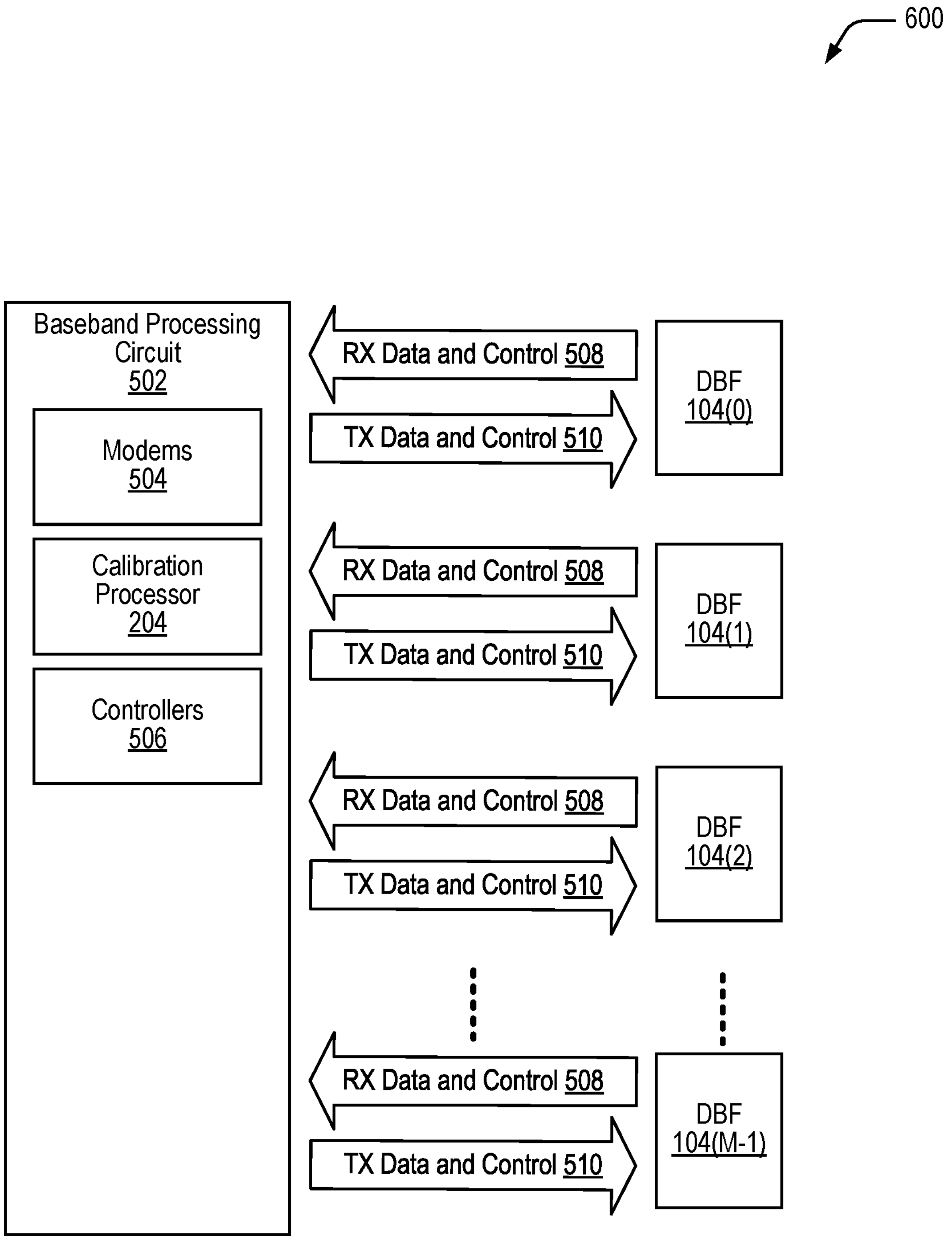
FIG. 6 depicts a block diagram of a system including a plurality of digital beamformer circuits coupled directly to a baseband processing circuit, in accordance with certain embodiments of the present disclosure.

FIG. 6 depicts a block diagram of a system 600 including a plurality of DBF circuits 104 coupled directly to the baseband processing circuit 502, in accordance with certain embodiments of the present disclosure. In this example, each DBF circuit 104 may be coupled by receive data and control channels 508 and transmit data and control channels 510. In this example, the DBF circuits 104 may be coupled to the baseband processing circuit 502 in parallel. Each DBF circuit 104 may include a plurality of beam modules 210.

The controller 506 may be configured to determine control data and instructions, which may be communicated to the DBF circuits 104 via a serial connection. In some implementation, the controller 506 may be a centralized controller configured to communicate to the plurality of the DBF circuits 104 to individually send configuration data to the controller 130 of each DBF circuit 104 and to receive one or more of calibration data or health check data from one or more of the multiple DBF circuits 104. In an example, the controller 506 may send configuration data to one or more of the DBF circuits 104 to initiate a calibration operation or a health check operation. In response, the one or more DBF circuits 104 may perform the calibration operation or the health check operation and may send calibration data or health check data to the centralized controller 506.

In some implementations, the centralized controller 506 may implement a control channel via input and output (I/O) interfaces 206 to each of the multiple DBF circuits 104 to set the coefficients and orchestrate one of a calibration operation or health check operation.

The architecture of the systems described herein may enable per-element calibration of the antenna array for both receive and transmit operations. Examples of receiver calibration techniques are described below with respect to FIG. 7.

Figure 7:
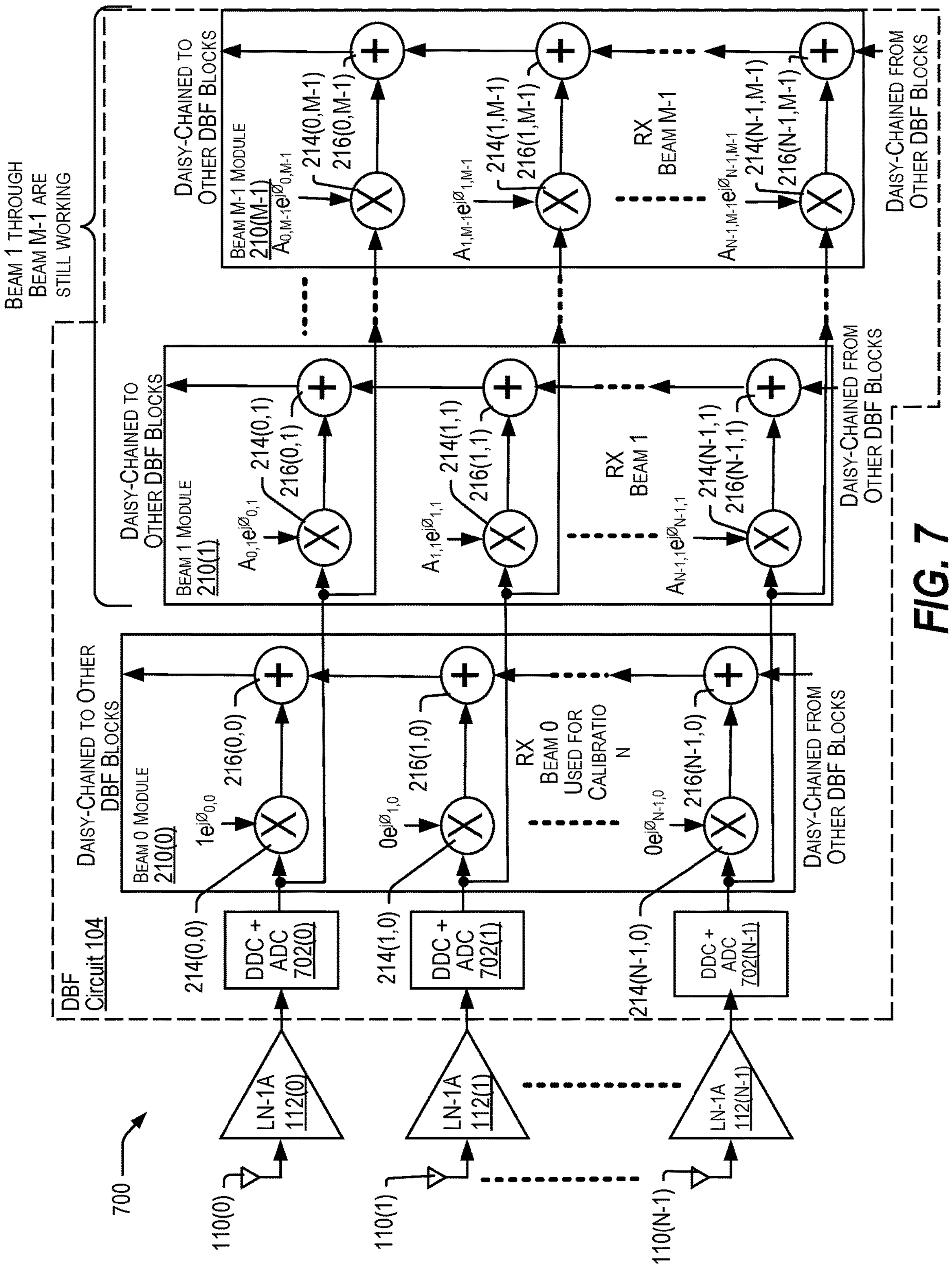
FIG. 7 depicts a block diagram of the system of FIG. 3 configured to provide calibration data from the receive path via a selected beam, in accordance with certain embodiments of the present disclosure.

FIG. 7 depicts a block diagram 700 of the system 300 of FIG. 3 configured to provide calibration data from the receive path via a selected beam, in accordance with certain embodiments of the present disclosure. In this example, beam 0 of the DBF 104(0) may be activated, while the beams 1 through N-1 are deactivated for the DBF 104(0). In this example, the complex multiplier $A_{N,B}$ of the first multiplier 214(0,0) is set to a value of $1e^{j\emptyset}$ while the values of the complex multiplier supplied to the other multipliers 214(1,0) through 214(N-1,0) are set to zero within the beam 0 module 210(0). In this example, the DBF circuit 104(0) activates beam zero for the antenna element 110(0) for communication of the calibration data to a baseband processor 204 and all other beams are zero for the beam 0 module 210(0). The other beam modules 210 of the DBF circuit 104 may continue receiving from each of other antenna elements, and beams 1 through M-1 may continue working. In this manner, the antenna element 110(0) and its associated receive path may be calibrated, and the calibration data may be provided to the baseband processor 204 via beam 0.

This type of calibration may be used in a receive mode for received signals incoming to the phased array while not utilizing the transmit elements associated with the antenna 110(0). In the illustrated example, the DBF circuit 104 may use a selected beam, such as beam 0, for communication of the calibration data based on a received signal at antenna 110(0) while keeping the antenna elements 110 alive for other beams (1 through M-1). The calibration process may be repeated, one antenna element 210 at a time, to calibrate the entire array.

In an example, the system may use this technique to perform a health check, where the system selectively enables one element to receive at a time to make sure each antenna element 110 receives the signal, element by element, with adequate power. In another example, the system may use this per-element calibration technique to provide a phase calibration, for example, at the factory, where a horn antenna points a signal from a known direction to the phased array in an anechoic chamber. In some implementations, the baseband processor 204 may calibrate each antenna element 210 based on the calibration data determined from the received phases.

In the example of FIG. 7, the controller 130 may be configured to manipulate the coefficients so that beam 0 for the selected antenna element 110 to be calibrated (in this instance, antenna element 110(0)) is set to 1 and the other coefficients for the beam 0 module 210(0) are set to zero for all other elements. The other beam modules 210 may remain active and may be used for beamforming for beams 1 through M-1, which beam 0 may be used to carry the calibration data.

In the illustrated example, the controller 130 may select beam 0 by setting the coefficient multiplier for the multiplier element 214(0) for the element 110(0) to be equal to 1, and the other coefficients for the multipliers 214 and 218 for the beam 0 module 210(0) for all other antenna elements 110 to be equal to zero 0. By setting the coefficient to 1 for the multiplier 214(0,0) of the beam 0 module 210(0) for the antenna element 110(0) to be calibrated only and by setting the coefficients for the multipliers 214 of the rest of the antenna elements 110 to zero, the I-Q data traversing the serial data lane in the adder path (output of adder 216(0,0) for beam 0 will not have any receive signal energy from any of the other antenna elements 210 except the antenna element 110(0) to be calibrated. Hence, the calibration data is exclusive to the selected antenna element 110(0). The calibration data may be transported (communicated) via beam 0 to the baseband processor 204, where the calibration table specific to the antenna element 110(0) may be computed. In other implementations, the calibration table may be computed by a controller 130 of the DBF circuit 104.

Figure 8A:
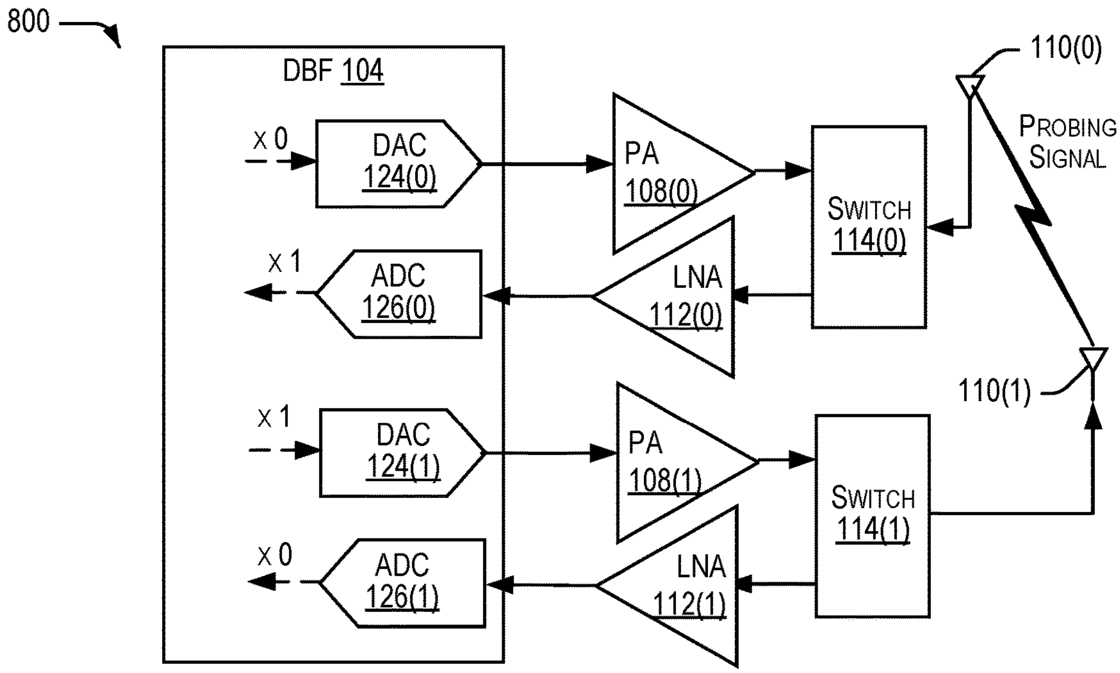
FIG. 8A depicts a block diagram of a portion of a system depicting calibration using an over-the-air signal generated by one antenna element and received by another, in accordance with certain embodiments of the present disclosure.

FIG. 8A depicts a block diagram of a portion of a system 800 depicting calibration using an over-the-air signal generated by one antenna element and received by another, in accordance with certain embodiments of the present disclosure. The system 800 may represent a portion of the systems depicted in any of the FIGS. 1-7.

In the illustrated example, the transmit path of the antenna element 110(0) is disabled by applying a zero valued coefficient to the multiplier 218 while the receive path of the antenna element 110(0) is activated by applying a coefficient to the multiplier 214 that equals 1. At the same time, the transmit path for the antenna 110(1) is activated while the receive path for the antenna 110(1) is disabled. In this example, the antenna 110(1) may be controlled to send a probe signal that can be received by the antenna 110(0). The received signal data may be provided as calibration data over a selected beam to the baseband processor 204. It should be appreciated that different antenna elements 110 may be selected to receive the probe signal at other antenna elements. Similarly, other antenna elements 110 may be selected to transmit the probe signal. The DBF 104 may select different antennas for transmit and receive and perform calibration operations one at a time for each antenna element 110 of the antenna array.

In this example, a calibration signal or probe signal may be sent from a transmitting antenna element 110(1) to a receiving antenna element 110(0), and both the transmit side of the antenna element 110(1) and the receive side of the antenna element 110(0) may be calibrated. In some implementations, calibration may also involve activation of a feedback loop or feedback path, such as that shown in FIG. 11 However, when enabling the feedback path, in one instantiation, the antenna path is switched out in favor of the feedback path, removing the antenna element from use across all the beams. Also, a selected beam, such as beam 0, may be removed and used for communication of the calibration data, although beams 1 to M-1 may be operational without signal data from the selected antenna elements 110 that are being used for the calibration.

Figure 8B:
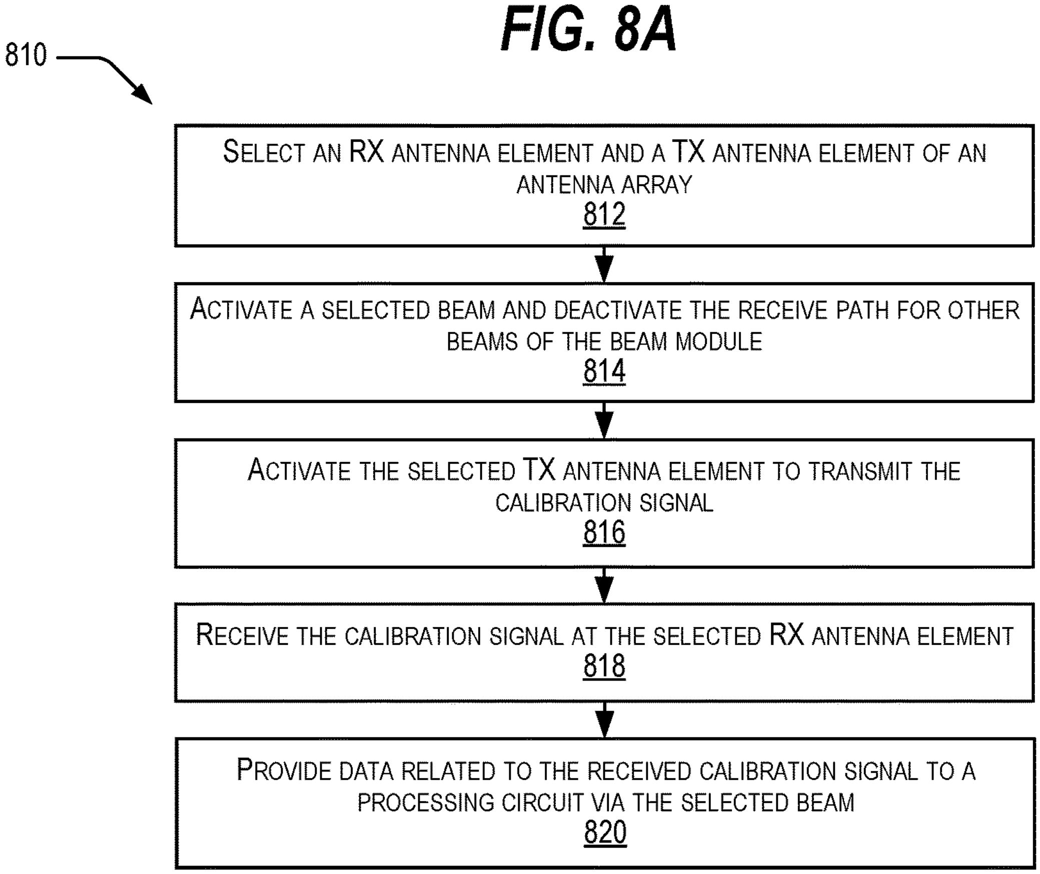
FIG. 8B depicts a flow diagram of a method of per-element calibration using the system described with respect to FIG. 8A.

FIG. 8B depicts a flow diagram of a method 810 of per-element calibration using the system described with respect to FIG. 8A. At 812, the method 810 may include selecting a receive antenna element 110(0) and a transmit antenna element 110(1) of an antenna array. The selected antenna elements 110(*x*,*y*) may be selected from any of the elements of the array. The selected numbers discussed in the method 810 are selected for illustrative purposes and are not intended to be limiting.

At 814, the method 810 may include activating a selected beam (such as beam 0) and deactivating the receive path for other beams (1 through M-1) for the selected beam module 210 (beam module 210(0). The selected beam (beam 0) may be used to communicate the calibration data to the baseband processor 204.

At 816, the method 810 may include activating the selected transmit antenna 110(1) to transmit the calibration (probe) signal. The signal may be provided to the PA 108, which may provide the amplified signal to the antenna 110(1). The signal may include calibration information for transmission.

At 818, the method 810 may include receiving the calibration (probe) signal at the selected receive antenna element 110(0). The received signal may be provided to the LNA 112(0) and communicated to the ADC 126(0) of the DBF circuit 104. At 820, the method 810 may include providing data related to the received calibration (probe) signal to the baseband processor 204 via the selected beam.

In this example, the calibration data may be communicated via beam 0 to the baseband processor 204.

Figure 9:
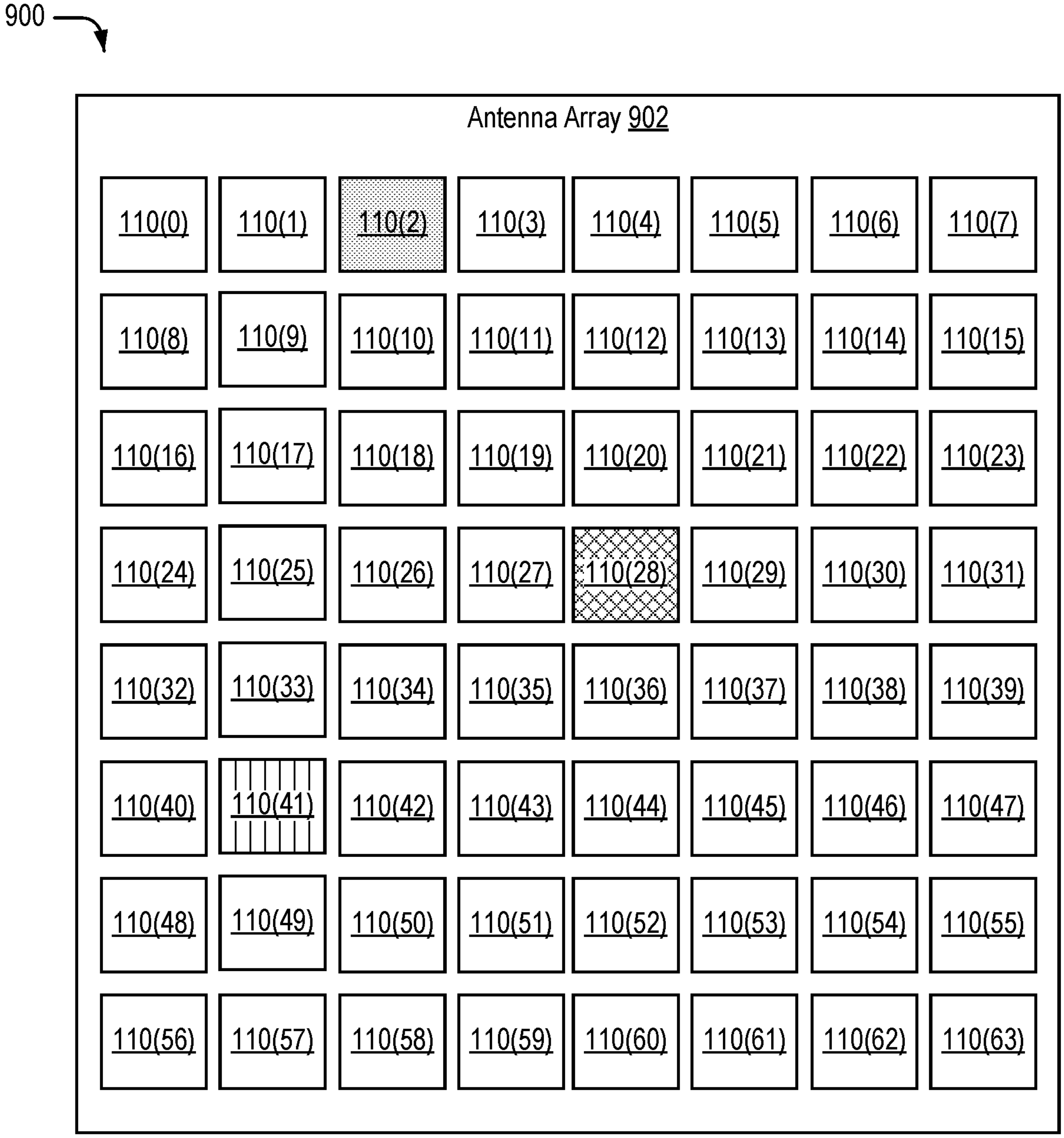
FIG. 9 depicts a block diagram of an antenna array that can be used to perform per-element over-the-air calibration, in accordance with certain embodiments of the present disclosure.

FIG. 9 depicts a block diagram 900 of an antenna array 902 that can be used to perform per-element over-the-air calibration, in accordance with certain embodiments of the present disclosure. The antenna array 902 may be comprised of a plurality of antenna elements 110 and may be an illustrative example of an antenna array as described above with any of the FIGS. 1-8. This particular example includes sixty-four antenna elements 110, but it should be appreciated that antenna arrays may be constructed that are smaller or larger, depending on the implementation.

In this example, the circuitry associated with an antenna element 110(28) may be activated to send a calibration signal, which may be received by the antenna element 110(2), which is configured to receive the calibration signal. The selected beam module 210 of the DBF circuit 104 coupled to the antenna element 110(2) may send data related to the calibration signal to the baseband processor 204 via the selected beam. It should be understood that each DBF circuit 104 can support N antenna elements 110, but each antenna element 110 may be coupled to one DBF circuit 104. The DBF circuit 104 may include all the parallel beam processors (beam modules 210) for the N antenna elements 210 which may process all the beams for that antenna element 110.

In some instances, it may be desirable to perform the calibration operation based on signals received from different selected transmitting antenna elements 110. Accordingly, the DBF circuit 104 (or another DBF circuit 104) may repeat the process by activating a different antenna element (such as the antenna element 110(41)) to send a calibration signal, which may be received by the antenna element 110(2). The DBF circuit 104 may communicate the received calibration data to the baseband processor 204 via the I/O interface 118 using the selected beam.

In some implementations, the baseband processor 204 may utilize known geometry of the receive antenna element 110(2) and the transmit antenna elements 110(28) and/or 110(41) to perform electromagnetic/link budget calculations to assist in over-the-air (OTA) calibrations. The system may repeat the process for selected receive antenna elements 110($x$) and for selected transmit antenna elements, 110($y$) one-at-a-time, until each antenna element 110 of the antenna array 902 is calibrated.

Figure 10:
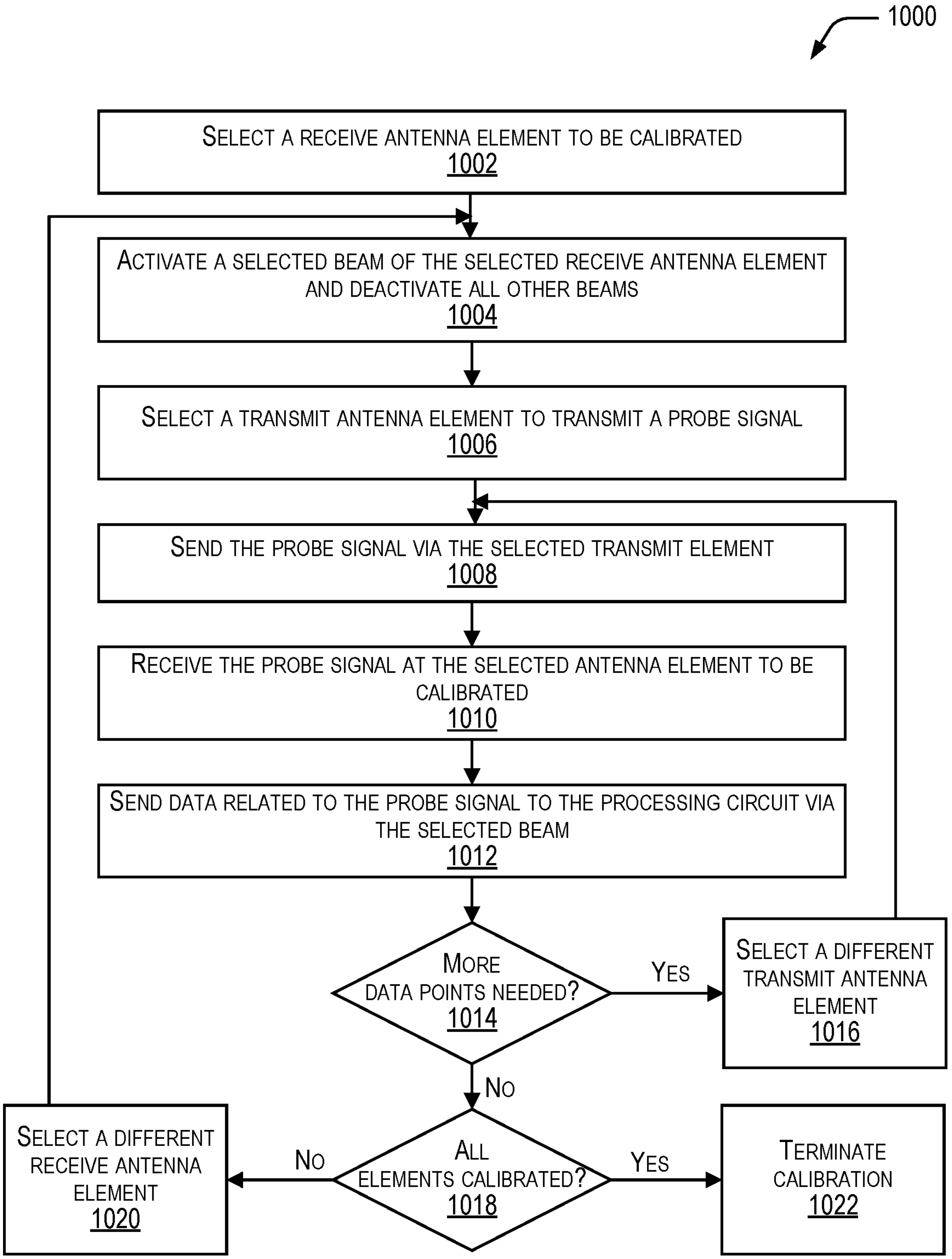
FIG. 10 depicts a flow diagram of a method of per-element over-the-air calibration, in accordance with certain embodiments of the present disclosure.

FIG. 10 depicts a flow diagram of a method 1000 of per-element over-the-air calibration, in accordance with certain embodiments of the present disclosure. The method may be used with any of the systems described above with respect to FIGS. 1-9. At 1002, the method 1000 may include selecting a receive antenna element 110($x$) to be calibrated. The antenna element 110($x$) may be selected from an array of antenna elements 110.

At 1004, the method 1000 may include activating a selected beam of the selected receive antenna element 110($x$) and deactivating all other beams for the selected antenna element. The selected beam may be used for communication of calibration data to the baseband processor 204. To deactivate the other beams, the controller 130 may set the complex multiplier for the multiplier for the other antenna elements 110(1) associated with the beam 0 module 210(0) equal to zero.

At 1006, the method 1000 may include selecting a transmit antenna element 110($y$) to transmit a probe (calibration) signal. The controller 130 may configure the complex multiplier associated with a multiplier 218 in the transmit path of the selected antenna element 110($y$) equal to 1. At 1008, the method 1000 may include sending the probe signal via the selected transmit antenna element 110($y$). The probe signal may include calibration data that is converted to an analog signal by the DUC+ADC 402 and provided to the PA 108, which amplifies the signal for transmission via the selected antenna element 110($y$).

At 1010, the method 1000 may include receiving the probe (calibration) signal at the selected receive antenna element 110($x$) to be calibrated. The antenna element 110($x$) may communicate the received signal to the LNA 112($x$), which may provide an amplified output signal to the ADC 126($x$). The data may be multiplied with the complex multiplier to produce calibration data.

At 1012, the method 1000 may include sending data related to the probe signal to the processing circuit 204 via the selected beam. The calibration data produced as a product of the received probe data and the complex multiplier may be sent to the baseband processor 204 via the selected beam.

At 1014, if more data points are needed for the calibration, the method 1000 may include selecting a different transmit antenna element 110($z$), at 1016. The method 100 may then return to 1008 to send the probe signal via the selected transmit antenna element 110($z$). Otherwise, at 1014, if more data points are not needed, the method 1000 may advance to 1018.

At 1018, if all the antenna elements 110 have not be calibrated, the method 1000 may include selecting a different receive antenna element 110($x$1), at 1020. The method 1000 may then return to 1004 to activate a selected beam and to deactivate other beams associated with the selected receive antenna element 110($x$1). Otherwise, at 1018, if all the elements have been calibrated, the method 1000 may include terminating the calibration operation, at 1022.

Figure 11A:
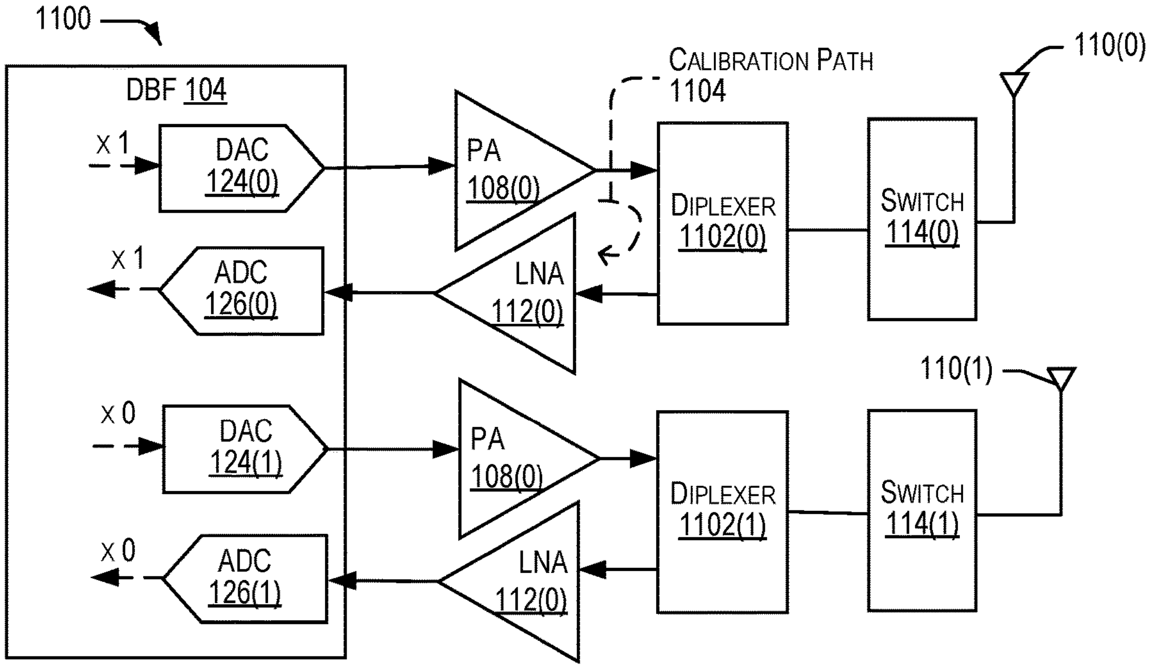
FIG. 11A depicts a block diagram of a portion of a system including a feedback path configured to provide per-element digital calibration of a transmit path of an antenna array, in accordance with certain embodiments of the present disclosure.

FIG. 11A depicts a block diagram of a portion of a system 1100 including a feedback path 1102 configured to provide per-element digital calibration of a transmit path of an antenna array, in accordance with certain embodiments of the present disclosure. In this example, the system 1100 may include a PA 108 including an input to receive a signal for transmission from the DBF 104 and an output coupled to an input of a switch 114(1) and to an input of a switch 114(2). The switch 114(1) may include an input/output coupled to the antenna element 110 and an output coupled to an input of the LNA 112.

The switch 114(2) may include an input coupled to the output of the PA 108, an input coupled to the output of the LNA 112, and an output coupled to the DBF 104. In this example, during calibration, the DBF 104 may provide a calibration signal to the input of the PA 108, the controller 130 (or an array controller of the antenna array) may disable the switch 114(1) and may enable the switch 114(2) to provide the output of the PA 108 to the DBF 104 as a feedback signal.

In this example, the controller 130 of the DBFs 104 may turn off a selected beam for each of the other antenna elements 110 and may turn off all the other beams of the selected antenna element 110. The DBF 104 may provide data related to the feedback signal to the baseband processor 204 via the I/O interfaces 118 and 206 using the selected beam. The baseband processor 204 may then determine calibration data for the antenna element 110 based on the feedback data. In some implementations, the baseband processor 204 may communicate the calibration data to the controller 130, which may use the calibration data to adjust one or more filter coefficients of the complex frequency to produce an adjusted output.

In the illustrated example, the controller 130, the baseband processor 204, a controller of the antenna array 902, or any combination thereof may trigger a switch or a diplexer 1102(0) in the path between the PA 108(0) and the antenna 110(0) and in the path between the antenna 110(0) and the LNA 112(0). The diplexer 1102(0) may activate a feedback path (calibration path 1104) between the output of the PA 108(0) and the DBF circuit 104. In some implementations, the feedback path (calibration path 1104) may bypass the LAN 112(0) and couple directly to an input of the ADC 126(0).

In some implementations, the controller 130, the baseband processor 204, a controller of the antenna array 902, or any combination thereof may switch the diplexer 112 to decouple or disconnect the antenna 110(0). The DBF 104 may send calibration data to the DAC 124(0), which may provide a calibration signal to the PA 108(0). The output of the PA 108(0) may be fed back via the diplexer 1102(0) to the input of the LNA (or directly to the ADC 126(0)). The DBF circuit 104 may set the complex coefficients for beam 0 associated with the antenna element 110(0) to equal 1 while setting the beam 0 for the other antenna element 110(1) through antenna element 110(N-1) are set to zero. The selected antenna element 110(0) is removed from all beams, while beams 1 through M-1 may still be used for the other antenna elements 110.

Figure 11B:
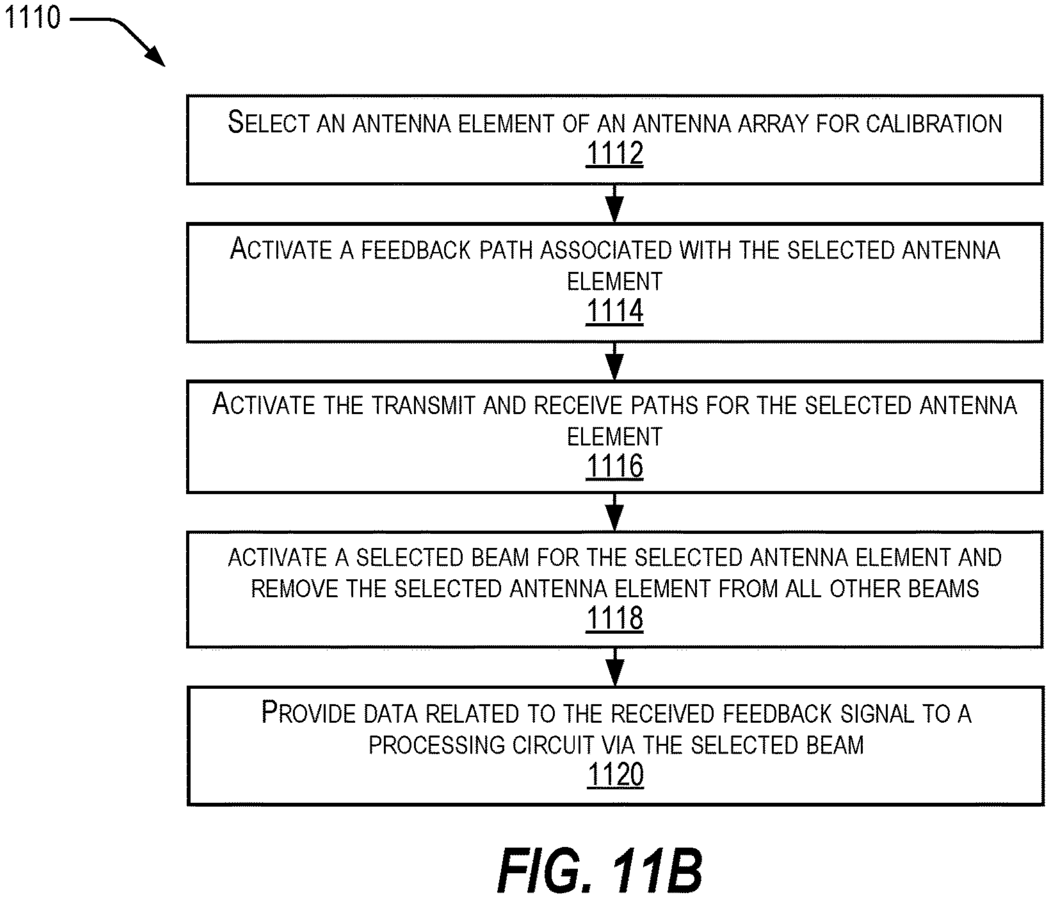
FIG. 11B depicts a flow diagram of a method of providing per-element digital calibration of a transmit path of an antenna array using a calibration signal, in accordance with certain embodiments of the present disclosure.

FIG. 11B depicts a flow diagram of a method 1110 of providing per-element digital calibration of a transmit path of an antenna array using a calibration signal, in accordance with certain embodiments of the present disclosure. In this example, the controller 130 may coordinate with controllers 130 of other DBFs 104 to deactivate beams or channels during the calibration operation.

At 1112, the method 1110 may include selecting an antenna element 110 of an antenna array for calibration. The controller 130 may select the antenna element 110 as part of a periodic calibration, based on a signal from the baseband processor 204, based on other data, or any combination thereof.

At 1114, the method 1110 may include activating a feedback path 1104 associated with the selected antenna element 110. In some implementations, a switch 114(0) may be activated to provide the signal at the output of the PA 108(0) to an input of the ADC 126(0) of the DBF circuit 104 and to prevent transmission of the calibration signal to the antenna element 110. In some implementations, the switch 114 may be controlled by signals from the controller 130, from a controller of the antenna array, from the baseband processor 204, or any combination thereof.

In some implementations, a second switch 114 (not shown) may be provided between the output of the LNA 112 and the input of the ADC 126. The second switch 114 may include an input coupled to the output of the PA 108, an input coupled to the output of the LNA 112, and an output coupled to the input of the ADC 126. In this example, the second switch 114 may be activated to provide the feedback path 1104 and the first switch 114(0) may be configured to selective couple the PA 108 or the LNA 112 to the antenna 110(0).

At 1116, the method 1110 may include activating the transmit and receive paths for the selected antenna element. The controllers may configure or adjust coefficients of the complex multipliers to activate or deactivate the transmit or receive paths.

At 1118, the method 1110 may include activating a selected beam for the selected antenna element 110 and remove the selected antenna element 110 from all other beams. The controller 130 of the DBF 104 may cooperate to disable the selected beams for the antenna elements 110 that are not being calibrated and to remove the antenna element 110 from calculations performed by the other beam modules 210.

At 1120, the method 1110 may include providing data related to the received feedback signal to a processing circuit 204 via the selected beam. The data from the feedback signal (i.e., feedback data) may be processed to determine digital calibration data, such as phase offset data, frequency offset data, power calibration data, other data, or any combination thereof. Alternatively, the feedback data may be processed to determine a health check.

Figure 12:
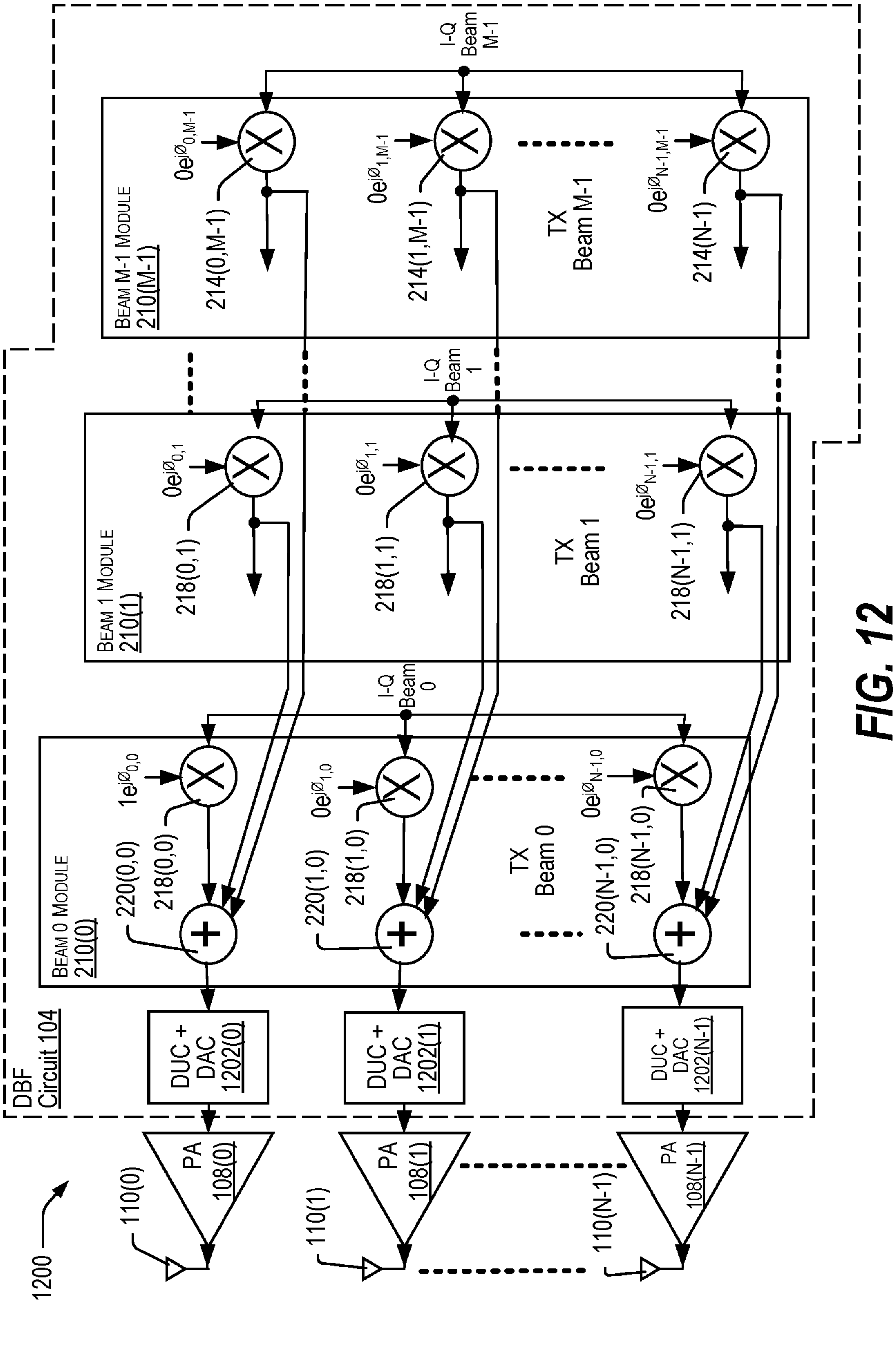
FIG. 12 depicts a block diagram of the system of FIG. 4 configured to calibrate a transmit path of a selected antenna element, in accordance with certain embodiments of the present disclosure.

FIG. 12 depicts a block diagram 1200 of the system 400 of FIG. 4 configured to calibrate a transmit path of a selected antenna element 110, in accordance with certain embodiments of the present disclosure. The illustrated example may be part of any of the systems described above with respect to FIGS. 1-11.

In this example, the selected antenna element 110(0) for calibration is configured so that the multiplier coefficient provided to the multiplier 218(0,0) is equal to 1 while the multipliers of the other multiplier coefficients provided to the other multipliers 218 are set to zero. In this example, the beam modules 210 are configured so that only beam 0 of the beam 0 module 210(0) is active while the other beam modules 210 associated with the DBF circuit 104(0) may be disabled.

The multiplier 218(0,0) receive a non-zero complex multiplier, while the other multipliers 218 may receive a zero-value multiplier such that the antenna elements 110 associated with the DBF 104(0) are disabled. By manipulating the coefficients, the controller 130 may selectively activate one antenna element 110(0) while deactivating the other antenna elements 110(1) through 110(N-1).

In general, for transmit side calibration, there are two methods that may be used: disable one antenna for calibration or disable the entire array. For one beam calibration, one antenna element 110 is removed from transmit beamforming. The transmit path may be calibrated with the feedback (calibration) path 1104 and a calibration signal. The entire array may be calibrated sequentially, element-by-element. A switch 114 may be activated to feedback the output from the PA 108 to the DBF circuit 104 to enable the feedback path 1104

In the other calibration process, the antenna array may be disabled, and all beams may be selectively enabled to provide OTA calibration on an element-by-element basis. Some antenna elements 110 may receive calibration signals and all the transmit elements may be sequentially calibrated using OTA calibration signals received by one or more receive antenna elements 110. Each antenna element 110 may thus be calibrated by selecting transmitting elements and receiving elements until each antenna element 110 has been calibrated.

Figure 13:
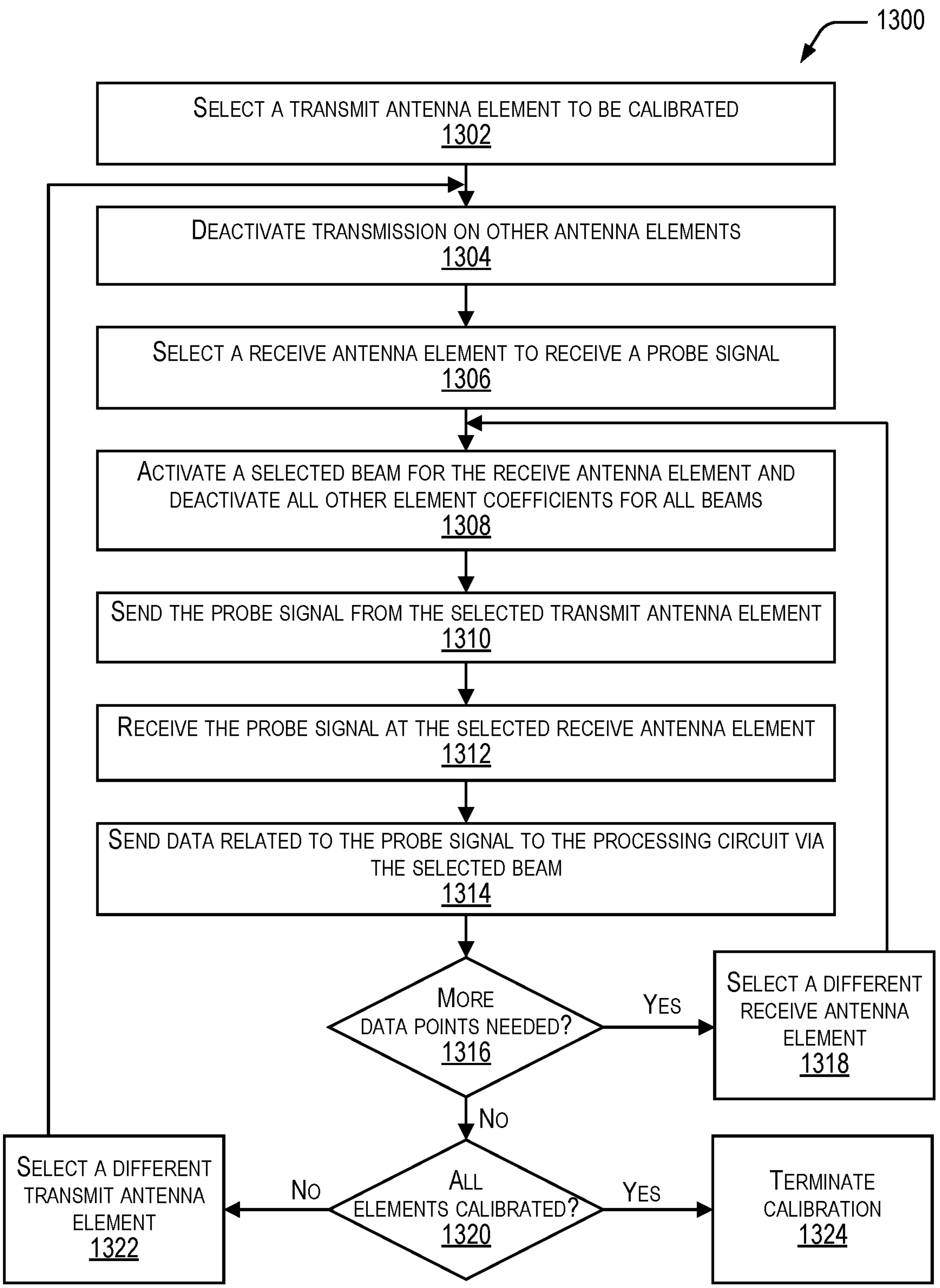
FIG. 13 depicts a block diagram of a method of calibrating a selected antenna element using over-the-air signals, in accordance with certain embodiments of the present disclosure.

FIG. 13 depicts a block diagram of a method 1300 of calibrating a selected antenna element using over-the-air signals, in accordance with certain embodiments of the present disclosure. The method 1300 may be used with any of the systems described above with respect to FIGS. 1-12.

At 1302, the method 1300 may include selecting a transmit antenna element 110(*y*) to be calibrated. The antenna element 110(*y*) may be selected from an array of antenna elements 110.

At 1304, the method 1300 may include deactivating transmission on other antenna elements 110. The transmission may be deactivated by the controller 130 setting the complex multipliers equal to zero.

At 1306, the method 1300 may include selecting a receive antenna element 110(*x*) to receive the probe (calibration) signal. The antenna element 110(*x*) may be selected from the array of antenna elements 110 and is different from the antenna element 110(*y*).

At 1308, the method 1300 may include activating a selected beam for the receive antenna element 110(*x*) and deactivating all other element coefficients for all other beams. At 1310, the method 1300 may include sending the probe (calibration) signal from the selected transmit antenna element 110(*y*). In some implementations, the DBF circuit 104 may provide the calibration data to the DAC 124, which may provide a calibration signal to a PA 108 for transmission via the antenna element 110(*y*).

At 1312, the method 1300 may include receiving the probe (calibration) signal at the selected receive antenna element 110(*x*). The received signal may be provided to an associated LNA 126, which may amplify the signal and provide it to the input of a DAC 124 of the DBF 104. The DAC 124 may convert the received signal into calibration data.

At 1314, the method 1300 may include sending the (calibration) data related to the probe signal to the processing circuit via the selected beam. At 1316, if more data points are needed, the method 1300 may include selecting a different receive antenna element 110(*x*1), at 1318. The method 1300 may then return to 1308 to activate a selected beam for the receive antenna element 110(*x*1).

Otherwise, at 1316, if more data points are not needed, the method 1300 may advance to 1320. At 1320, if all antenna elements have not been calibrated, the method 1300 may include selecting a different transmit antenna element 110 (*y*1), at 1322. The method 1300 may then include returning to 1304 to deactivate transmission on other antenna elements. Otherwise, at 1318, if all the antenna elements 110 have been calibrated, the method 1300 may include terminating the calibration operation, at 1324.

It should be understood that the calibration operations may be performed on a per-element basis, one at a time, for the entire array or for portions of the antenna array. An example is described with respect to FIG. 14.

Figure 14:
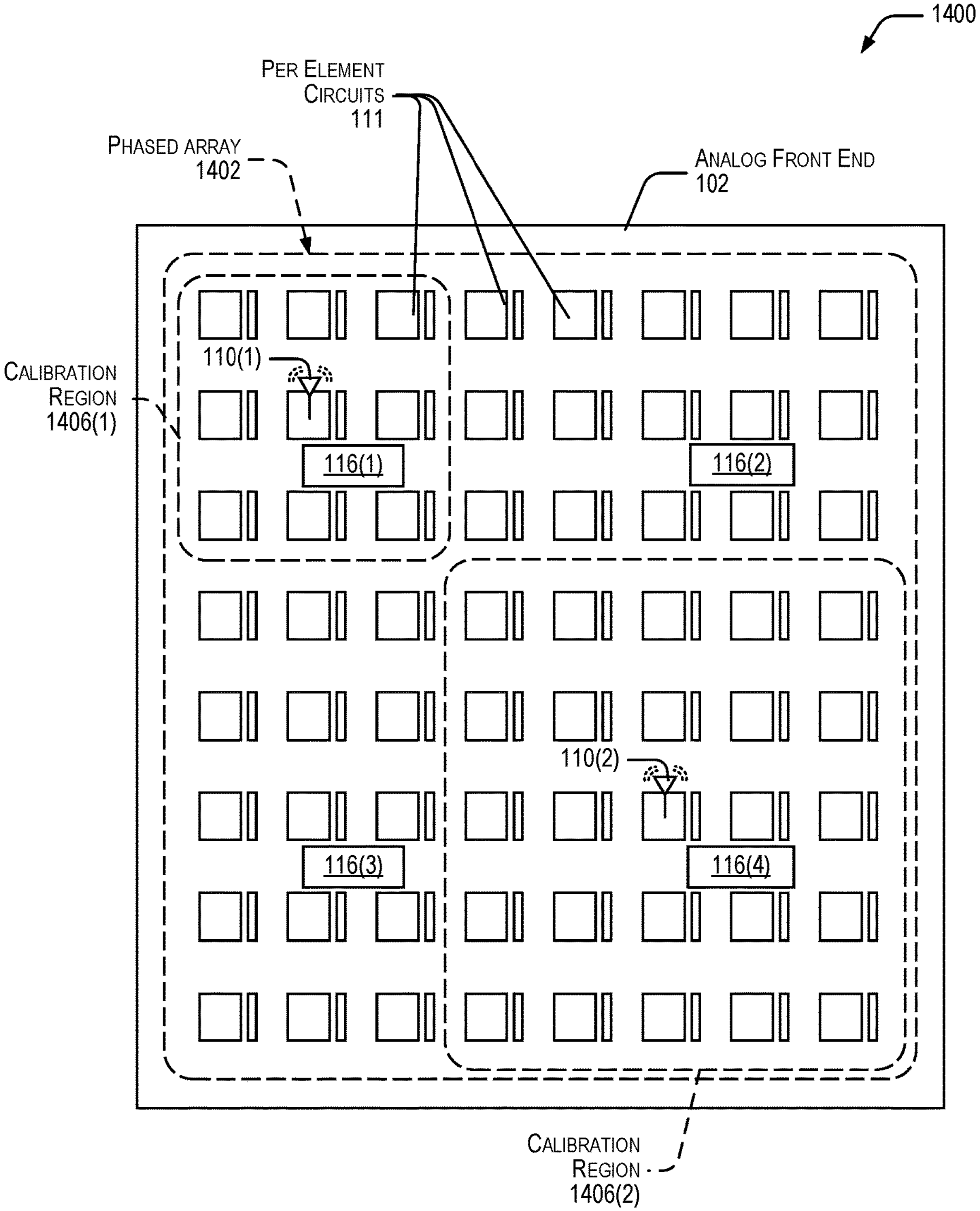
FIG. 14 depicts a block diagram of an antenna array including embedded sensors for transmit and receive path calibrations, in accordance with certain embodiments of the present disclosure.

FIG. 14 depicts a block diagram 1400 of an antenna array 1402 including embedded sensors 116 for transmit and receive path calibrations, in accordance with certain embodiments of the present disclosure. In the illustrated example, sensors 116 may be distributed in areas across the phased array 1402. The sensors 116 may include temperature sensors, power sensors (e.g., a diode power sensor), other sensors, or any combination thereof, which may be distributed across the array.

In addition to transmit/receive signal data, the DBF 104 or the baseband processor 204 may receive sensor data, and the calibration may be performed based on one or more of the sensor data and the calibration data. Arbitrary calibration regions may be selected, such as the calibration regions 1406(1) and 1406(2), each of which may incorporate multiple antenna elements 110, associated per-element circuits 111, and at least one sensor 116.

In an example, the sensor data may be used to calibrate the transmit side first for a selected transmit antenna element 110(*y*). The calibrated transmit antenna element 110(*y*) may then be used to transmit calibration signals, which may be received by selected receive antenna elements 110(*x*) to calibrate the receive path on a per-element basis, using one of the previously discussed methods.

Figure 15:
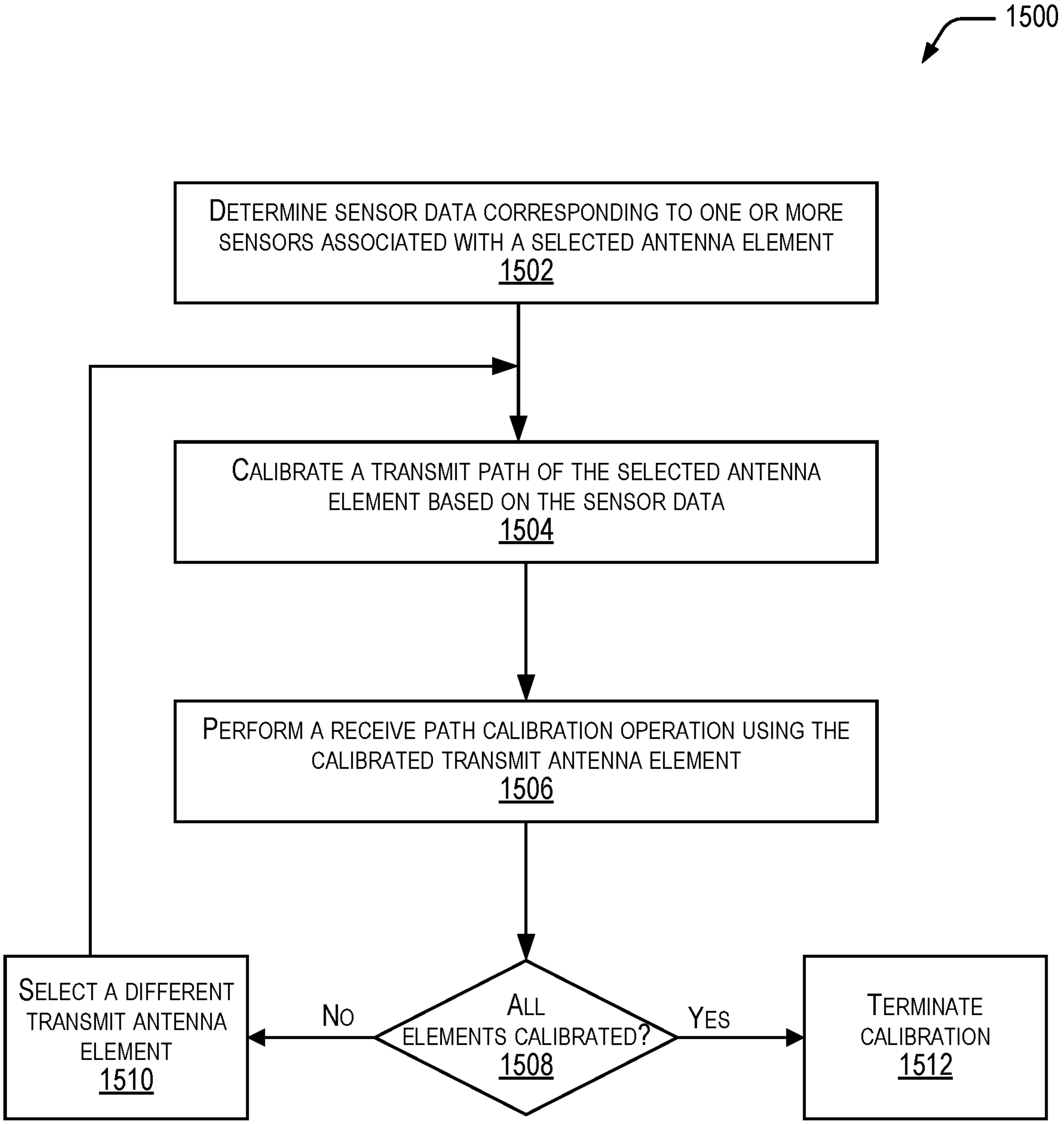
FIG. 15 depicts a block diagram of a method of calibrating the antenna array, in accordance with certain embodiments of the present disclosure.

FIG. 15 depicts a block diagram of a method 1500 of calibrating the antenna array, in accordance with certain embodiments of the present disclosure. The method 1500 may be used with any of the systems or arrays described above with respect to FIGS. 1-14.

At 1502, the method 1500 may include determining sensor data corresponding to one or more sensors 116 associated with a selected antenna element 110. In an example, the selected antenna element 110 may be within a region that may be associated with measurement data captured by the one or more sensors 116.

At 1504, the method 1500 may include calibrating a transmit path of the selected antenna element based on the sensor data. In an example, a calibration table may include coefficient values to pre-compensate for distortion introduced in the transmit path by temperature or power variations. The measurement data may be used to determine the appropriate coefficients.

At 1506, the method 1500 may include performing a receive path calibration operation using the calibrated transmit antenna element 1506. The transmit antenna element 110(*y*) may send a calibration signal through the air that may be received at a selected receive antenna element 110(*x*).

At 1508, the method 1500 may include determining if all the antenna elements 110 have been calibrated. If not, the method 1500 may include selecting a different transmit antenna element 1510, at 1510. The method 1500 may then include returning to 1504 to calibrate the transmit path. Otherwise, at 1508, if all the antenna elements 110 have been calibrated, the method 1500 may include terminating the calibration operation.

In some implementations, the method 1500 may also be performed with respect to multiple receive antenna elements 110(*x*) and multiple transmit antenna elements 110(*y*), enabling off-line calibration of the entire array. In some implementations, sensor data and feedback loop data may be used to calibrate the transmit paths, and OTA transmission from one antenna element 110 to another may be used to calibrate the receive path.

In conjunction with the systems, methods, and devices described above with respect to FIGS. 1-15, the DBF circuit 104 and its circuit configurations may enable per-element calibration of an antenna array. In some instances, a selected antenna element 110 may be calibrated while other antenna elements 110 continue operating normally and calibration data may be communicated to a baseband processor 204 via a selected beam. In other instances, portions of the array may be taken offline to enable per-element calibration. In still other instances, the entire antenna array may be taken offline to enable per-element calibration.

The controller 130 of the DBF circuit 104 may control the complex multiplier coefficients of the beam modules 210 to enable or disable selected beams, selected antenna elements 110, or any combination thereof. Additionally, the controllers 130 may utilize selected beams to communicate calibration data to the baseband processor 204 via the existing serial communication paths. Calibrations may be controlled or initiated by the baseband processor 204, by the controllers 130, or any combination thereof.

Although the present invention has been described with reference to preferred embodiments, workers skilled in the art will recognize that changes may be made in form and detail without departing from the scope of the invention.

What is claimed is:

1. A system comprises:

an analog front end circuit that includes an antenna array comprised of a plurality of antenna elements;

multiple digital beamformer (DBF) circuits coupled to the analog front end, each DBF circuit is coupled to a subset of the plurality of antenna elements, each DBF circuit comprises:

a plurality of beam modules, each beam module corresponding to the subset of the plurality of antenna elements, each beam module includes a multiplier including a first input to receive data, a second input to receive a complex multiplier, and an output to provide a complex product;

a controller configured to provide coefficients to each of the complex multipliers independently to selectively enable or disable one or more of a beam, a selected antenna element, a transmit path, or a receive path to determine calibration data or health check data for a selected antenna element of the antenna array;

a centralized controller configured to communicate to the plurality of the DBF circuits to individually send configuration data to the controller of each DBF circuit and receive one or more of calibration data or health check data from one or more of the multiple DBF circuits; and a control channel implemented from the centralized controller via input and output (I/O) interfaces to each of the multiple DBF circuits to set the coefficients and orchestrate one of a calibration operation or health check operation.

2. The system of claim 1, wherein the controller of each DBF circuit is configured to perform a calibration operation according to a selected mode of a plurality of calibration modes.

3. The system of claim 2, wherein, in the selected mode of the plurality of calibration modes, the controller controls the complex multiplier of each multiplier of the plurality of beam modules to disable a selected beam.

4. The system of claim 2, wherein:

the analog front end circuit includes a switch configured to enable a feedback path from a transmit path to a receive path of a selected antenna element; and in the selected mode of the plurality of calibration modes, the controller controls the complex multiplier of each multiplier of the plurality of beam modules to disable a selected beam or to deactivate a selected antenna element for others of the plurality of beam modules.

5. The system of claim 2, wherein, in the selected mode of the plurality of calibration modes, the controller is configured to:

disable transmit and receive operations of the antenna array;

enable a first selected antenna element for transmission to transmit a probe signal; and enable a second selected antenna element for reception of the probe signal.

6. The system of claim 5, wherein the controller is configured to:

disable the first selected antenna element;

enable a third selected antenna for transmission to transmit a second probe signal; and enable the second selected antenna element for reception of the second probe signal.

7. The system of claim 5, wherein the controller is configured to:

disable the second selected antenna element;

enable the first selected antenna element for transmission to transmit a second probe signal; and enable a third selected antenna element for reception of the second probe signal.

8. The system of claim 1, wherein the controller is configured to:

provide first coefficients of selected ones of the multipliers of the plurality of beam modules to enable a receive path and disable a transmit path of a first antenna element;

provide second coefficients of selected ones of the multipliers of the plurality of beam modules to enable a transmit path and disable a receive path of a second selected antenna element;

send a calibration signal from the second selected antenna element to the first selected antenna element;

adjust one or more third coefficients of selected ones of the multipliers of the plurality of beam modules to select a beam of a plurality of beams; and provide calibration data determined from the calibration signal to a baseband processor via the selected beam.

9. The system of claim 1, wherein the controller is configured to selectively toggle values of the coefficients provided to selected ones of the multipliers to selectively disable or enable a selected antenna element.

10. The system of claim 1, wherein the controller is configured to selectively provide the coefficients of selected one of the of the plurality of beam modules to:

activate a receive path of a selected antenna element to receive a signal;

deactivate a selected beam for one or more other antenna elements; and communicate data related to the received signal as the calibration data to a baseband processing circuit via the selected beam.

11. The system of claim 1, wherein:

each DBF circuit includes an input/output interface;

one of the controllers of one of the multiple DBF circuits or a processor of a baseband processing circuit is configured to selectively activate a switch of the analog front end circuit to disconnect a selected antenna element and to provide a feedback path from a transmit path to receive path of the analog front end circuit; and the controller provides a calibration signal to a power amplifier of the selected antenna element and receives a feedback signal from the feedback path, the controller is configured to provide data related to the feedback signal to a baseband processing circuit via the input/output interface directly or through an intervening DBF circuit in a daisy-chain using a selected beam.

12. The system of claim 1, wherein:

the analog front end circuit includes one or more sensors, the one or more sensors configured to generate electrical signals indicative of one or more of a temperature, a power level, a phase, a frequency, or another parameter of the analog front end circuit; and the controller is configured to calibrate one or more elements of the transmit path based on the electrical signals from the one or more sensors.

13. The system of claim 1, wherein the controller is configured to:

adjust first coefficients to enable a receive path and disable a transmit path of a selected receive antenna element;

adjust second coefficients to enable a transmit path and disable a receive path of a selected transmit antenna element;

send a health check signal from the selected transmit antenna element to the selected receive antenna element;

adjust third coefficients to select a beam of a plurality of beams; and provide element level health check data determined from a received calibration signal to a baseband processor via the selected beam.

14. The system of claim 1, wherein the controller is configured to selectively provide coefficients of one or more of selected ones of the multipliers to:

activate a receive path of a selected antenna element to receive a signal;

deactivate a selected beam for one or more other antenna elements; and communicate data related to the received signal as the health check data to the baseband processing circuit via the selected beam.

15. A system comprising:

a baseband processing circuit;

an analog front end circuit coupled to an antenna array including a plurality of antenna elements; and an integrated circuit including an input/output (I/O) interface coupled to the baseband processing circuit and including a plurality of digital beamformer (DBF) circuits coupled to one another in a daisy-chain configuration, one of the DBF circuits coupled to the I/O interface, each DBF circuit coupled to a subset of the plurality of antenna elements, each DBF circuit comprising:

a DBF I/O interface configured to couple one of the I/O interface of the integrated circuit or to another DBF circuit of the plurality of DBF circuits;

a plurality of beam modules, each beam module including a plurality of multipliers and adders, each multiplier configured to receive complex data at a first input, to receive a complex multiplier at a second input, and to provide an output signal corresponding to a product of the complex data and the complex multiplier; and a controller coupled to each of the plurality of multipliers and configured to provide the complex multiplier to the input of each of the plurality of multipliers, during a calibration operation or a health check operation, the controller configured to selectively activate or deactivate one or more of a beam, a selected antenna element, a transmit path, or a receive path to determine calibration data or health check data for a selected antenna element and to reserve a selected beam for communication of the calibration data or the health check data from the analog front end circuit to the baseband processing circuit.

16. The system of claim 15, further comprising:

a centralized controller configured to communicate to the plurality of the DBF circuits to individually send configuration data to the controller of each DBF circuit and receive one or more of calibration data or health check data from one or more of the plurality of DBF circuits; and a control channel implemented from the centralized controller via input and output (I/O) interfaces to each of the plurality of DBF circuits to set coefficients and orchestrate one of a calibration operation or health check operation.

17. The system of claim 15, wherein the controller is configured to selectively provide coefficients of one or more of the plurality of multipliers to disable or enable a selected antenna element.

18. The system of claim 15, wherein the controller is configured to selectively activate a receive path of a selected antenna element to receive a signal and to communicate data related to the signal as the calibration data to the baseband processing circuit via the selected beam.

19. The system of claim 15, wherein one of the controller of one of the DBF circuits or a processor of the baseband processing circuit is configured to:

select an antenna element for calibration;

selectively control a switch associated with a selected antenna element to disconnect the antenna element and to enable a feedback path from an output of a power amplifier of the analog front end circuit to a receive path coupled to the one of the DBF circuits;

provide a calibration signal from the one of the DBF circuits to the power amplifier;

receive a signal from the output of the power amplifier via the feedback path;

convert the signal to digital data; and provide the digital data as calibration data to the baseband processing circuit via the selected beam.

20. The system of claim 15, wherein the controller of each of the DBF circuits is configured to selectively provide coefficients one or more of the multipliers to enable calibration of a selected antenna element while allowing the other antenna elements to operate normally minus the selected beam.

21. The system of claim 15, wherein the controller is configured to:

receive data related to one or more sensors of the analog front end corresponding to the subset of the plurality of antenna elements;

calibrate one or more components based on the received data;

selectively provide coefficients to one or more first multipliers to enable a transmit path and disable a receive path of a selected transmit antenna element;

selectively provide coefficients one or more second multipliers to disable a transmit path and enable a receive path of a selected receive antenna element;

send a calibration signal via the selected transmit antenna element;

receive the calibration signal at the selected receive antenna element; and provide the calibration data related to the calibration signal to the baseband processing circuit via the selected beam.

22. The system of claim 15, wherein the controller is configured to:

adjust first coefficients to enable a receive path and disable a transmit path of a selected receive antenna element;

adjust second coefficients to enable a transmit path and disable a receive path of a selected transmit antenna element;

send a health check signal from the selected transmit antenna element to the selected receive antenna element;

adjust third coefficients to select a beam of a plurality of beams; and provide element level health check data determined from a received calibration signal to a baseband processor via the selected beam.

23. The system of claim 15, wherein the controller is configured to selectively provide coefficients of one or more of the plurality of multipliers to activate a receive path of a selected antenna element to receive a signal, to deactivate a selected beam for one or more other antenna elements; and to communicate data related to the received signal as the health check data to the baseband processing circuit via the selected beam.

* * * * *